US012561348B2

(12) United States Patent
Yang et al.

(10) Patent No.: US 12,561,348 B2
(45) Date of Patent: Feb. 24, 2026

(54) SEMANTIC-TREE-BASED AI CONTENT MANAGEMENT PLATFORM

(71) Applicant: Microsoft Technology Licensing, LLC, Redmond, WA (US)

(72) Inventors: Chenguang Yang, Seattle, WA (US); Weiyao Xie, Seattle, WA (US); Michael Urciuoli, Seattle, WA (US); Haris Syed, Redmond, WA (US); Erik Thomas Oveson, Renton, WA (US); Thong Quang Nguyen, Seattle, WA (US); Md Tanvir Islam Aumi, Redmond, WA (US); Michael James Bentley, Bellevue, WA (US); Ilya Tumanov, Redmond, WA (US); Ruqiang Guo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/677,152

(22) Filed: May 29, 2024

(65) Prior Publication Data

US 2025/0371041 A1 Dec. 4, 2025

(51) Int. Cl.
*G06F 16/00* (2019.01)
*G06F 16/242* (2019.01)
(Continued)

(52) U.S. Cl.
CPC .......... *G06F 16/322* (2019.01); *G06F 16/243* (2019.01); *G06F 16/24522* (2019.01);
(Continued)

(58) Field of Classification Search
CPC .... G06F 16/322; G06F 16/36; G06F 16/3329; G06F 16/3344; G06F 16/93;
(Continued)

(56) References Cited

U.S. PATENT DOCUMENTS 11,657,044 B2 * 5/2023 Reschke ................ G16H 10/60
707/771
12,271,698 B1 * 4/2025 Wang ................ G06F 16/24522
(Continued)

FOREIGN PATENT DOCUMENTS

WO WO 2019229769 A1 * 12/2019
WO WO 2022246194 A1 * 11/2022

OTHER PUBLICATIONS

Ankita Sharma et al., "Deep learning based bi-polar sentiment classification of movie reviews in Hindi", Journal of Statistics & Management Systems, vol. 27 (2024), No. 1, pp. 59-86.*
(Continued)

*Primary Examiner* — Srirama Channavajjala
(74) *Attorney, Agent, or Firm* — Novo TechIP International PLLC

(57) ABSTRACT

A data processing system implements receiving a call requesting a generative model to generate a semantic tree for a source content; constructing a first prompt including the source content and instructions to the model to analyze a semantic structure of the source content and to generate a semantic outline and content chunks of the source content, the semantic outline including one or more topics each connected with one or more of the content chunks, to compute one summary for each of the content chunks, to apply indices to reference each topic node of the semantic tree to one of the topics, and to apply indices to reference each leaf node of the semantic tree to one of the content chunks and the respective summary; providing the first prompt to the model and receiving the semantic tree of the source content; and storing the semantic tree in a database.

20 Claims, 11 Drawing Sheets

(51) Int. Cl.

| | |
|---|---|
| *G06F 16/2452* | (2019.01) |
| *G06F 16/31* | (2019.01) |
| *G06F 16/3329* | (2025.01) |
| *G06F 16/334* | (2025.01) |
| *G06F 16/36* | (2019.01) |
| *G06F 16/75* | (2019.01) |
| *G06F 16/901* | (2019.01) |
| *G06F 16/93* | (2019.01) |
| *G06N 20/00* | (2019.01) |

(52) U.S. Cl.
CPC ...... *G06F 16/3329* (2019.01); *G06F 16/3344* (2019.01); *G06F 16/36* (2019.01); *G06F 16/75* (2019.01); *G06F 16/901* (2019.01); *G06F 16/9024* (2019.01); *G06F 16/93* (2019.01); *G06N 20/00* (2019.01)

(58) Field of Classification Search
CPC .... G06F 16/901; G06F 16/75; G06F 16/7343; G06F 16/24522; G06F 16/243; G06F 16/9024; G06F 40/30; G06F 40/205; G06N 20/00; G06N 5/022
See application file for complete search history.

(56) References Cited

U.S. PATENT DOCUMENTS

| | | | | |
|---|---|---|---|---|
| 2020/0125803 | A1* | 4/2020 | Jezewski | G06F 40/284 |
| 2021/0350087 | A1* | 11/2021 | Mohajer | G06Q 30/0283 |
| 2022/0157300 | A1* | 5/2022 | Sharifi | G10L 15/26 |
| 2022/0222469 | A1* | 7/2022 | Rao | G06V 10/764 |
| 2023/0014700 | A1* | 1/2023 | Karaca | G06F 16/9024 |
| 2023/0244875 | A1* | 8/2023 | Venkateshwaran | G06Q 40/08 704/9 |
| 2024/0135106 | A1* | 4/2024 | Hunter | G06F 40/284 |
| 2024/0160837 | A1* | 5/2024 | Agarwal | G06F 40/166 |
| 2024/0160851 | A1* | 5/2024 | Medapati | G06F 40/295 |
| 2024/0311561 | A1* | 9/2024 | Mao | G06F 40/253 |

OTHER PUBLICATIONS

Zihua Si, et al., "Generative Retrieval with Semantic Tree-Structured Item Identifiers via Contrastive Learning", Conference'17, Jul. 2017, Washington, DC, USA, pp. 1-10.*

Gafni, et al., "Make-a-Scene: Scene-Based Text-to-Image Generation with Human Priors", Computer Vision—ECCV, Oct. 31, 2022, pp. 89-106.

International Search Report and Written Opinion received for PCT Application No. PCT/US2025/017115, mailed on May 8, 2025, 15 pages.

Lempitsky, et al., "A Pylon Model for Semantic Segmentation", Advances in Neural Information Processing Systems 24-NIPS, Dec. 2011, 09 pages.

Shah Aanal, "Enhanced Summarization: Retrieval-Augmented Generation (RAG), LLM and Fine-Tuning", Retrived from internet URL: https://medium.com/@aanalshah2001/enhanced-summarization-retrieval-augmented-generation-rag-llm-and-fine-tuning-366c4e0fb388, Nov. 30, 2023, 11 pages.

* cited by examiner

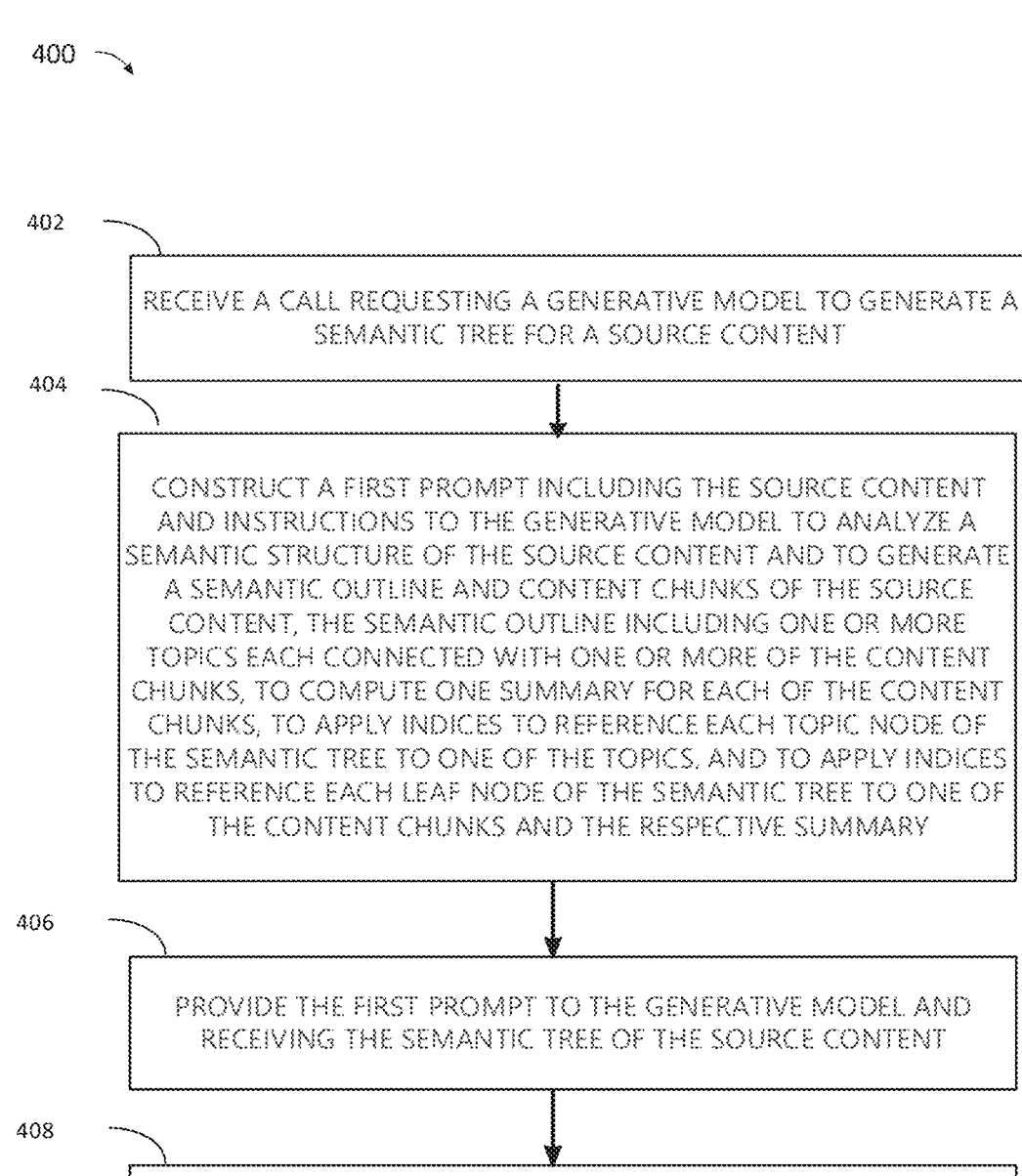

400

402

RECEIVE A CALL REQUESTING A GENERATIVE MODEL TO GENERATE A SEMANTIC TREE FOR A SOURCE CONTENT

404

CONSTRUCT A FIRST PROMPT INCLUDING THE SOURCE CONTENT AND INSTRUCTIONS TO THE GENERATIVE MODEL TO ANALYZE A SEMANTIC STRUCTURE OF THE SOURCE CONTENT AND TO GENERATE A SEMANTIC OUTLINE AND CONTENT CHUNKS OF THE SOURCE CONTENT, THE SEMANTIC OUTLINE INCLUDING ONE OR MORE TOPICS EACH CONNECTED WITH ONE OR MORE OF THE CONTENT CHUNKS, TO COMPUTE ONE SUMMARY FOR EACH OF THE CONTENT CHUNKS, TO APPLY INDICES TO REFERENCE EACH TOPIC NODE OF THE SEMANTIC TREE TO ONE OF THE TOPICS, AND TO APPLY INDICES TO REFERENCE EACH LEAF NODE OF THE SEMANTIC TREE TO ONE OF THE CONTENT CHUNKS AND THE RESPECTIVE SUMMARY

406

PROVIDE THE FIRST PROMPT TO THE GENERATIVE MODEL AND RECEIVING THE SEMANTIC TREE OF THE SOURCE CONTENT

408

STORE THE SEMANTIC TREE IN A DATABASE

FIG. 4

SEMANTIC-TREE-BASED AI CONTENT MANAGEMENT PLATFORM

BACKGROUND

Artificial intelligence (AI) content management involves different use scenarios like questions and answers (Q&A), content summarization, content transformation across data/file types, and the like using generative models. These use scenarios offer significant opportunities for increasing efficiency and improving user experience. However, the existing AI content management platforms often operate by providing a full document to a large language model (LLM). This results in significant computational resources and high latency, and offers little opportunity to reuse cached results across use scenarios. Another challenge across the use scenarios is consistency for running the generative model each time. Taking document transformation (e.g., from .docx to .pptx) as an example, the existing AI content management platforms often end up with radically different segmentations on different calls for the same document. Hence, there is a need for new approach or architecture supporting AI content intelligence efficiency, consistency, code/prompt reusability, coverage, and scalability.

SUMMARY

An example data processing system according to the disclosure includes a processor and a machine-readable medium storing executable instructions. The instructions when executed cause the processor alone or in combination with other processors to perform operations including receiving a call requesting a generative model to generate a semantic tree for a source content; constructing, via a prompt construction unit, a first prompt by appending the source content to a first instruction string, the first instruction string including instructions to the generative model to analyze a semantic structure of the source content and to generate a semantic outline and content chunks of the source content, the semantic outline including one or more topics each connected with one or more of the content chunks, to compute one summary for each of the content chunks, to apply indices to reference each topic node of the semantic tree to one of the topics, and to apply indices to reference each leaf node of the semantic tree to one of the content chunks and the respective summary; providing, via the prompt construction unit, as an input the first prompt to the generative model and receiving as an output the semantic tree of the source content from the generative model; and storing the semantic tree in a database.

An example method implemented in a data processing system includes receiving a call requesting a generative model to generate a semantic tree for a source content; constructing, via a prompt construction unit, a first prompt by appending the source content to a first instruction string, the first instruction string including instructions to the generative model to analyze a semantic structure of the source content and to generate a semantic outline and content chunks of the source content, the semantic outline including one or more topics each connected with one or more of the content chunks, to compute one summary for each of the content chunks, to apply indices to reference each topic node of the semantic tree to one of the topics, and to apply indices to reference each leaf node of the semantic tree to one of the content chunks and the respective summary; providing, via the prompt construction unit, as an input the first prompt to the generative model and receiving as an output the semantic tree of the source content from the generative model; and storing the semantic tree in a database.

An example non-transitory computer readable medium according to the disclosure on which are stored instructions that, when executed, cause a programmable device to perform functions of receiving a call requesting a generative model to generate a semantic tree for a source content; constructing, via a prompt construction unit, a first prompt by appending the source content to a first instruction string, the first instruction string including instructions to the generative model to analyze a semantic structure of the source content and to generate a semantic outline and content chunks of the source content, the semantic outline including one or more topics each connected with one or more of the content chunks, to compute one summary for each of the content chunks, to apply indices to reference each topic node of the semantic tree to one of the topics, and to apply indices to reference each leaf node of the semantic tree to one of the content chunks and the respective summary; providing, via the prompt construction unit, as an input the first prompt to the generative model and receiving as an output the semantic tree of the source content from the generative model; and storing the semantic tree in a database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow chart of an example process for providing semantic-tree-based AI content management according to the techniques disclosed herein.

DETAILED DESCRIPTION

Figure 1:
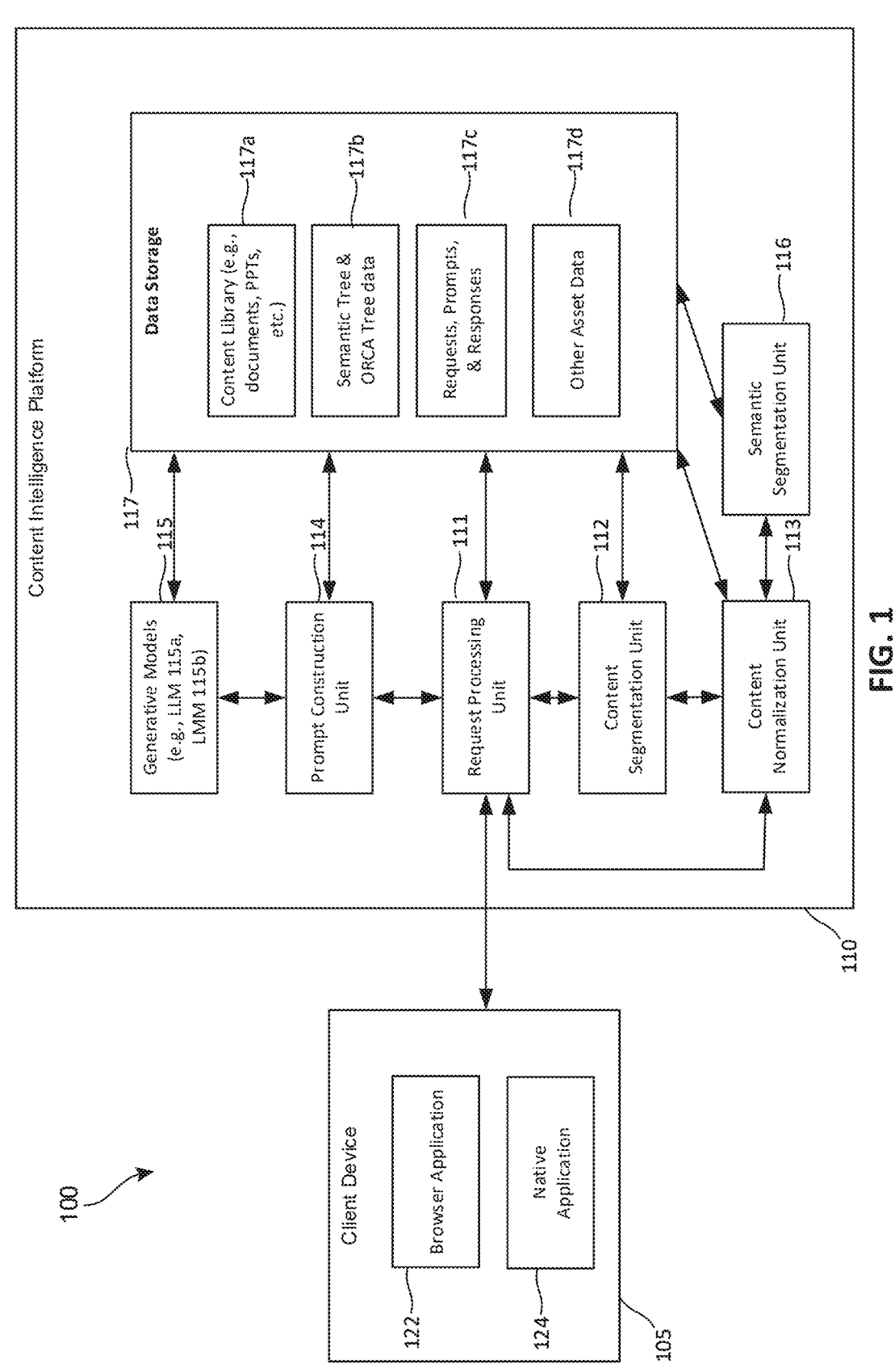
FIG. 1 is a diagram of an example computing environment in which the techniques for providing semantic-tree-based AI content management are implemented.

Whether the AI content management use scenarios are summary generation, Q&A, semantic commanding, content transformation, or the like, current mechanisms involve feeding a full document into the LLM. This not only results in latencies (e.g., up to a minute), but also results in document truncation due to a token size limit of the LLM (e.g., 32 k). In addition, existing generative models (e.g., GPT-4) suffer from gaps in their coverage when queried about long documents, for example, U-shaped coverage gaps (where the model knows a lot about the beginning/end, but lacks clarity regarding the middle parts of a long document). To combat these problems, a semantic-tree-based AI content management solution was proposed by the inventors to automatically convert and save content of different nature (e.g., data types, file types, and the like) into semantic trees, which can be pre-processed to reduce latency in the use scenarios. Beside efficiency, the semantic-tree-based AI content management solution supports AI content management with high level of parallelism, consistency, caching, user steerability, code/prompt reusability, scalability, and other technical benefits as discussed below.

In one embodiment, the semantic-tree-based AI content management solution decomposes a content item (e.g., a document) into discrete content chunks consumable by the LLM, and builds a semantic tree for the document based on the content chunks. The content chunks of the semantic tree (instead of the full document) are then provided to the LLM using a retrieval-augmented generation (RAG) pattern, whether for Q&A, summary, transformation, or semantic commanding. As a consequence, the semantic-tree-based AI content management solution can go over multiple content sources (e.g., different documents) for the use scenarios, and scale the use scenarios over multiple documents in parallel, with consistency, user steerability, code/prompt reusability, and scalability. The semantic-tree-based AI content management solution is general-purposed and language-agnostic to apply to all generative models.

In one embodiment, the solution relates to an improved method for content transformation in which content is converted from a first medium, e.g. a word processor document, to a second medium, e.g., a spreadsheet, using a semantic tree as an intermediate format that allows for automatically keeping transformed content updated and synchronized. For instance, the method uses LLMs to merge the content based on the semantic tree for matching the structure of the content, e.g., style, tone, voice, and formatting of the first medium. The technical problem being addressed is that transforming content between mediums is typically done manually, which is time-consuming and error prone, and may not preserve the structure of the first medium. In some implementations, the method is implemented using a content transformation architecture that includes a content intelligence platform that constructs the semantic tree capturing a semantic layout for the content in the first medium and allowing for updates to the semantic tree without altering the structure of the transformed content in the second medium. Aspects of the method include manipulating (e.g., combining) multiple semantic trees, retrieving content using different levels of summaries of the semantic trees, and the like.

Although various embodiments are described with respect to content transformation from one medium (e.g., Word) to another (e.g., PowerPoint), it is contemplated that the approach described herein may be used in other content management use scenarios, such as Q&A, summary, semantic commanding, and the like.

A technical benefit of the approach provided herein is to deploy a consistent representation of content across different use scenarios such as summary generation, Q&A, content type transformation, and the like, thereby promoting a consistent reuse of prompts and code.

Another technical benefit of this approach is to segment and process content in consumable chunks by the LLM. The content chunks are provided to the LLM using a RAG pattern such that each use scenario (whether it's Q&A, summary generation, data type transformation, or semantic commanding) can be processed, instead of passing the full document.

Another technical benefit of this approach is to process over multiple documents using content segmentation as well as semantic segmentation, thereby scaling up the use scenarios over multiple documents.

Another technical benefit of this approach is to pre-process the content into content chunks and summaries only once. The generated preprocessed content is by definition optimized for better utilization, thereby processing different use scenarios in real-time or in substantially real-time and reducing latency.

Yet another technical benefit of this approach is to use map-reduce for high parallelism whether its Q&A, transformation, summary or even semantic commanding, that are inherently parallelizable across the document content, thereby parallelizing all the processing efforts.

Another technical benefit of this approach is to reduce latency by eliminating the unnecessary content chunks of semantic trees to satisfy a use scenario, such as answering a query.

Another technical benefit of this approach is to apply an intermediate form, i.e., semantic trees, which can be independently validated for consistency and using it as a way to support different use scenarios like transformation, thereby ensuring that the transformed content output is consistent for users.

Another technical benefit of this approach allows a user to steer outcomes of LLMs predictably with a version of the content (e.g., semantic trees) that is consistent, validated for consistency, and has the necessary information.

Another technical benefit of this approach is to provide hierarchical segmentation of content to ensure limited number of tokens are sent for all online and offline scenarios to get a predictable behavior out of the model and rely on parallelism for reasoning over multiple chunks of the content.

Another technical benefit of this approach allows maintaining references to the original content thereby providing users with content grounding information (such as citations). These features among the overall process details described below in the disclosure provide a novel solution from both a technical and functional standpoint. These and other technical benefits of the techniques disclosed herein will be evident from the discussion of the example implementations that follow. Although various embodiments are described with respect to a semantic tree, it is contemplated that the approach described herein may be used with all types of semantic graphs.

FIG. 1 is a block diagram illustrating an example of an application services platform 100. The application services platform 100 may include a content intelligence platform (CIP) 110, and client devices (including a client device 105) which, in some examples, all connect to a network (e.g., including a cloud).

Each of the content intelligence platform 110 and the client devices, resides at an on-premises or cloud-based infrastructure. The hardware for implementing the content intelligence platform 110 depends on several factors, such as the type of tools/generative models to use, whether using an on-premises or cloud-based infrastructure, or the like. The application services platform 100 can use one or more computing devices to run the content intelligence platform 110, one or more data storages to store content (e.g., documents, ppt files, and the like), semantic tree and ORCA tree data, requests, prompts, and responses, and other asset data, and a reliable network to connect the one or more computing devices and the one or more storages. In one embodiment, the hardware for implementing the content intelligence platform 110 stands alone. In another embodiment, the hardware for implementing the content intelligence platform 110 is embodied in an existing system, such as a chatbot (e.g., Microsoft Copilot). In yet another embodiment, the content intelligence platform 110 is embodied on one or more edge devices, such as the user's local device. The user's local device can possibly operate in a way without a network or Internet connection, when a generative language model is available locally.

The computing devices may include virtually any type of general- or specific-purpose computing devices with data processing units. For example, a computing device may be a user device such as a desktop computer, a laptop computer, a tablet computer, a display device, a camera, a printer, or a smartphone. Likewise, a computing device may also be a server device such as an application server computer, a virtual computing host computer, or a file server computer. Likewise, the computing device may be an example of any of the devices, a device within any of the distributed systems, illustrated in or referred to in any of the following figures, as discussed in greater detail below.

FIG. 1 and the corresponding description of FIG. 1 in this disclosure illustrate an example system for illustrative purposes and does not limit the scope of the disclosure. The content intelligence platform 110 may be a part of one or more distributed systems.

The content intelligence platform 110 implements the semantic-tree-based AI content management solution. FIG. 1 illustrates an example content intelligence platform 110 for illustrative purposes and does not limit the scope of the disclosure. The example implementation illustrated in FIG. 1 includes a single client device 105 that utilizes services provided by the content intelligence platform 110.

The client device 105 includes a native application 124 and a browser application 122. The native application 124 is a web-enabled native application, in some implementations, which enables semantic-tree-based AI content management. The web-enabled native application utilizes services provided by the content intelligence platform 110 including but not limited to creating, viewing, and/or converting semantic trees of various types of file types. The native application 124 implements a user interface 305 shown in FIGS. 3A-3B in some implementations. In other implementations, the browser application 122 is used for accessing and viewing web-based content provided by the content intelligence platform 110. In such implementations, the content intelligence platform 110 utilizes one or more web applications, such as the browser application 122, that enables users to view, create, and/or convert semantic trees of various types of file types using for example an online application. The browser application 122 implements the user interface 305 shown in FIGS. 3A-3B in some implementations. The content intelligence platform 110 supports both the native application 124 and the browser application 122 in some implementations, and the users may choose which approach best suits their needs.

The content intelligence platform 110 includes a request processing unit 111, a content segmentation unit 112, a content normalization unit 113, a prompt construction unit 114, generative model(s) 115, a semantic segmentation unit 116, and a data storage 117. The request processing unit 111 is configured to receive requests from the native application 124 and/or the browser application 122 of the client device 105. The requests may include but are not limited to requests to create, view, and/or convert semantic trees of various types of files according to the techniques provided herein. The data storage 117 is stored with a content library 117a (e.g., documents, ppt files, and the like), semantic tree and ORCA tree data 117b, requests, prompts, and responses 117c, and other asset data 117d, to be created/processed/ converted by the content segmentation unit 112, the content normalization unit 113, the prompt construction unit 114, the generative model(s) 115 (including an LLM 115a), and the semantic segmentation unit 116 as explained below.

Figure 2A:
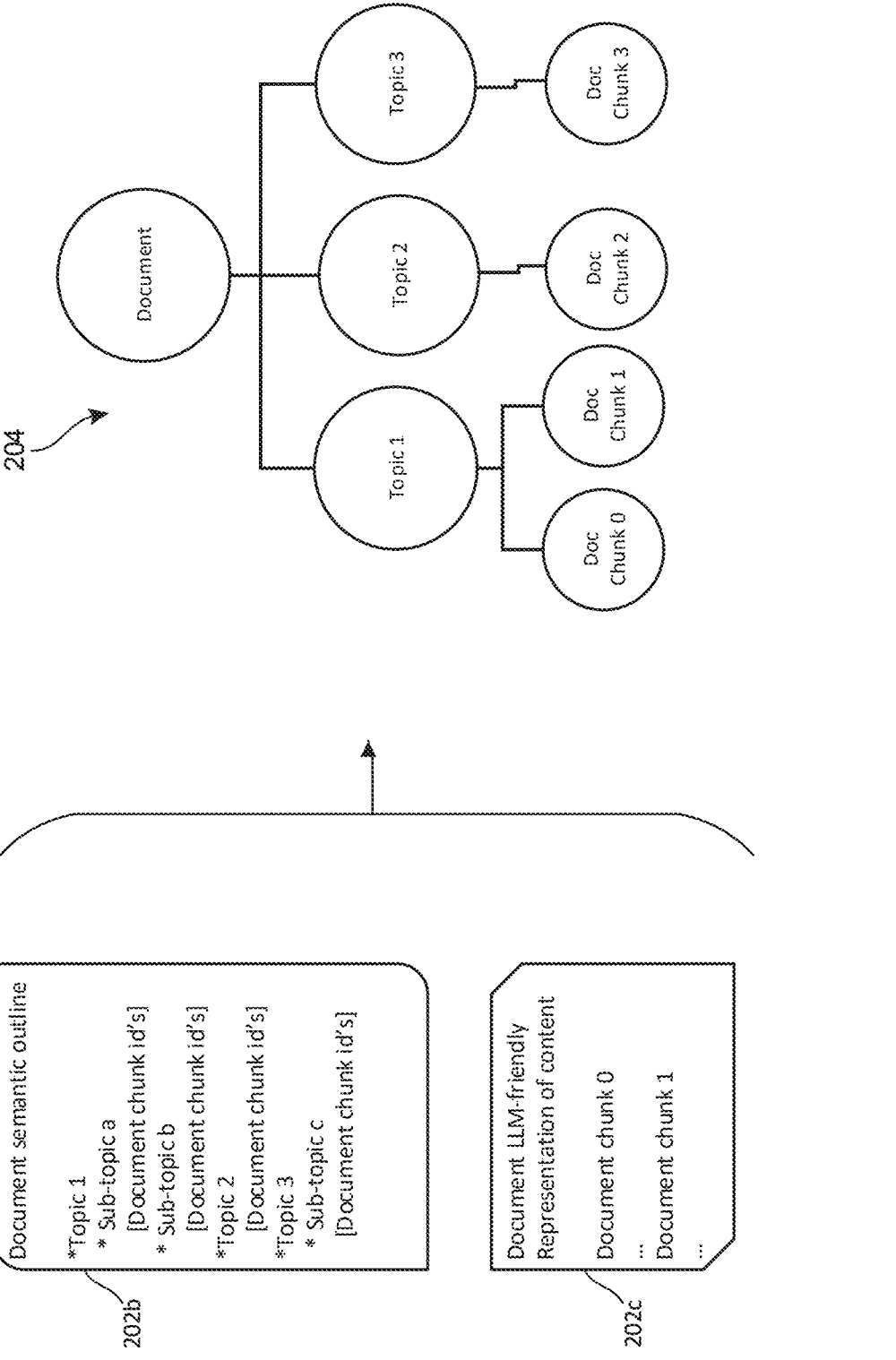
FIGS. 2A-2E are conceptual diagrams of the semantic-tree-based AI content management of the system of FIG. 1.

FIG. 2A is an example semantic graph (e.g., a semantic tree) according to the semantic-tree-based AI content management of the system of FIG. 1. FIG. 2A illustrates an example semantic tree for illustrative purposes and does not limit the scope of the disclosure. By way of example, the request processing unit 111 receives a conversion request via the browser application 122 of the client device 105 to transform a source content 202 (e.g., a document 202a) into a semantic tree 204. In this example, the request processing unit 111 sends the conversion request to the semantic segmentation unit 116 that works in conjunction with the prompt construction unit 114 using a meta prompt (see Table 1) to analyze the document's semantic structure to create a semantic outline 202b for the document 202a by calling the LLM 115a to infer the semantic outline 202b by understanding the content of the document. Beside the semantic outline 202b, the LLM 115a also outputs a mapping of document indexes and/or other references to outline sections of the semantic outline 202b. For example, the indexes provide references to the original content of the document. Alternatively, the request processing unit 111 can apply code in addition to LLM prompting to build semantic trees and to perform different use scenarios, such as Q&A, summary, transformation, semantic commanding, and the like. In other words, these tasks can be performed via a combination of LLM instructions (i.e., prompts) as well as traditional executable code logic (no LLMs involved). For example, the request processing unit 111 can involve an orchestration engine (e.g., Microsoft Semantic Kernel®) to orchestrates data flows between AI models and plugins executing code to perform these tasks.

In addition to prompts for converting a source content into a semantic tree (e.g., "textAnalysisOneShot", "textAnalysisOneShotInternational"), Table 1 also includes prompts for comparing semantic trees (e.g., "deltaTreeBuild"), prompts for merging semantic trees (e.g., "semanticTreeMergeLongDoc", "semanticTreeMerge", and he like), prompts for converting multiple level outlines to a list of topics sections (e.g., "semanticTreeToTopics"), prompts for syncing a target content with updates to a source content (e.g., "contentSyncUpTreeToTopics"), and the like.

TABLE 1

```
export enum TextAnalysisPrompt {
    textAnalysisOneShot = 'Given the document from the user, output an outline in
markdown format. The outline should divide the document into topics and further sub-topics,
``` in order to produce the most detailed outline. Follow each item in the outline with the
[startIndex] which represents which element index that starts that section. You should split
topics into smaller subtopics to cover all the important details. Do not skip any important
information. You should not use duplicate indices for topics. Each index should only appear
once. You should use 3-10 words for topics and subtopics.
Example output:
<outline>
- One-sentence description of Topic1 [0]
    - One-sentence description of Sub-topic1 [1]
      - One-sentence description of Sub-topic1.1 [2]
      - One-sentence description of Sub-topic1.2 [3]
      - One-sentence description of Sub-topic1.3 [4]
    - One-sentence description of Sub-topic2 [5]
    - One-sentence description of Sub-topic3 [6]
- One-sentence description of Topic2 [7]
- One-sentence description of Topic3 [10]
    - One-sentence description of Sub-topic1 [11]
    - One-sentence description of Sub-topic2 [13]
</outline>
Document:
<|input_text|>
Output outline:
<outline>',
    textAnalysisOneShotInternational =
    'Given the document from the user, output an outline in markdown format. The outline
should divide the document into topics and further sub-topics, in order to produce the most
detailed outline. Follow these rules when generating the sections:
1. Follow each item in the outline with the [startIndex] which represents which element index
that starts that section.
2. Do not skip any important information.
3. You MUST not repeat the same index anywhere in the outline. Each index must only
appear once.
4. You should use 3-10 words for topics and subtopics.
5. The first line of the outline should indicate the language of the source document using a
language code, like en, en-US, es, zh-CN, etc. The outline should use that same language.
Example output:
<outline>
- language: <language code detected>
- One-sentence description of Topic1 [0]
    - One-sentence description of Sub-topic1 [1]
      - One-sentence description of Sub-topic1.1 [2]
      - One-sentence description of Sub-topic1.2 [3]
      - One-sentence description of Sub-topic1.3 [4]
    - One-sentence description of Sub-topic2 [5]
    - One-sentence description of Sub-topic3 [6]
- One-sentence description of Topic2 [7]
- One-sentence description of Topic3 [ ]
    - One-sentence description of Sub-topic1 [11]
    - One-sentence description of Sub-topic2 [13]
</outline>
Document:
<|input_text|>
Output outline:
<outline>
',
    deltaTreeBuild = 'You are given an outline of the original document, the summary of the
original document and the updated document. You should copy over the topics from outline
of the original document and edit it to make the updated outline based on the information
given to you, then you need to map the topics to the indices in the updated document.
When creating the updated outline. You should follow these rules:
1. You should review the updated document and summary of original document to identify
the changes in the document.
2. You should copy over the outline of the original document and edit it to make the updated
outline.
3. There are two operations you can use to edit the outline: (Added) and (Update). You
should use (Added) to mark the new topics or subtopics that are not in the original outline.
You should use (Update) to mark the updated topics or subtopics in the original outline.
4. When you use (Added) to add a new topic, the topic you add should reflect the new content
in the updated document, and different from any of the existing topics.
5. If you need to update the existing topics in the original outline. Use (Update) at the end of
the topics section to mark the updated topics.
6. You should use (Added) when new content is added to the document and (Update) when
there is a big change that causes the shifting of meaning in the topic.
7. The updated outline you generate must contain at least one (Update) or (Added) to show
the differences in two versions of article.
8. Do not update all the topics in the original outline.
9. Add indices to each topic in the updated topic [startIndex] which represents which element
index that starts that section. Ignore the indices in the original outline, you should use indices
from updated Document.
Here is an example output:

TABLE 1-continued

Example output:
<outline>
- One-sentence description of Topic1 [0]
    - One-sentence description of Sub-topic1 [1]
        - One-sentence description of Sub-topic1.1 [2]
        - One-sentence description of Sub-topic1.2(Added) [3]
        - One-sentence description of Sub-topic1.3 [4]
    - One-sentence description of Sub-topic2 [5]
    - One-sentence description of Sub-topic3 [6]
- One-sentence description of Topic2 [7]
- One-sentence description of Topic3 [10]
    - One-sentence description of Sub-topic1 [11]
    - One-sentence description of Sub-topic2(Updated) [13]
</outline>
Here is the summary of original Document:
<doc>
<|input_ppt_content|>
</doc>
Here is the updated Document:
<doc>
<|input_text]>
</doc>
Here is the outline for the original document:
<outline>
<|original_outline|>
</outline>
Output outline for updated document:
<outline>
',
    semanticTreeMergeLongDoc = 'Given the outlines from the user, output a combined
outline in markdown format. The outlines are for different parts of the same document. You
should merge the outlines and generate an overall outline for this document. The overall
outline will later be used to create a PowerPoint presentation. The overall outline you
generate should be strictly under 45 topics.{languageControl}
Here are some rules to create the overall outline:
1. The overall outline should identify and synthesize topics and further sub-topics.
2. There can only be two levels of topics: Topics and Subtopics.
3. There should not be any duplicate topics. If there are duplicate topics in outlines, you
should merge them in the overall outline.
4. You should merge topics or subtopics that have the same coverage, but you should not
miss any important information.
5. You MUST not repeat the same index anywhere in the outline. Each index must only
appear once.
6. Each topic should be unique.
Example output:
<outline>
- One-sentence description of Topic1 [startIndex-endIndex]
    - One-sentence description of Sub-topic1 [index]
    - One-sentence description of Sub-topic2 [index, index ...]
    - One-sentence description of Sub-topic3 [index]
- One-sentence description of Topic2 [startIndex-endIndex]
- One-sentence description of Topic3 [startIndex-endIndex]
    - One-sentence description of Sub-topic1 [index]
    - One-sentence description of Sub-topic2 [startIndex-endIndex, index]
</outline>
Make sure the outline you generate has less than 45 topics in total.
Documents:
<|input_text|>
Merged outline:
<outline> ',
    semanticTreeMerge = 'Given the documents from the user, output a combined outline in
markdown format.
The outline should identify and synthesize topics and further sub-topics
across all documents, in order to produce the most organized and cohesive outline. Follow
each item in the outline with the [startIndex-endIndex, index, ...]
which represents the elements that belong to that section.
All source indexes from the source documents MUST be included in the outline in some
[range].
You should merge topics or subtopics that have the same coverage, but you should not miss
any important information.
There should not be any duplicate topics. If there are duplicate topics in outlines, you should
merge them in the overall outline. Each topic in the generated in the outline should be
unique.{languageControl}
Example output.
<outline>
- One-sentence description of Topic1 [index, index ...]
    - One-sentence description of Sub-topic1 [index]
    - One-sentence description of Sub-topic2 [index, index ...]
    - One-sentence description of Sub-topic3 [index]
    - One-sentence description of Topic2 [index, index]

TABLE 1-continued

- One-sentence description of Topic3 [index, index, index]
   - One-sentence description of Sub-topic1 [index, index ...]
   - One-sentence description of Sub-topic2 [index]
</outline>
Documents:
<|input_text|>
Merged outline:
<outline>',
    semanticTreeToTopics = 'You are an assistant who is good at converting multiple level
outline to a list of topics sections. The outline for a document is shown below which covers
element ranges from the document in square brackets [index or startIndex-endIndex].
Your job is to create a numbered list of topic sections in markdown, which cover all the
important information. You can only use information from the input outline. Do not create
new information on your own.
{languageControl}
Follow these rules when generating the sections:
1. You should include a title for all input as the first section, and a conclusion section at the
end.
2. You should output a range of index for the content under the topic. You must use this
format [startIndex-endIndex,...] to represent a range of content for each section.
3. The outline you create should contain all the major information in the input outline. Merge
topics when input outline is longer than the output section number limit.
4. Do not use indentation between sections.
5. You MUST not repeat the same index anywhere in the outline. Each index must only
appear once.
6. You must only use indices that appear in the input outline. You must not create indices on
your own.
7. You must create {outlineRange} topic sections for the outline. Do not exceed this limit.
Example output:
<sections>{titleExample}
- Section title 1 [1-3]
- Section title 2 [4-15]
- Section title 3 [16-30]
...
{sectionTitles}
</sections>
Input Outline:
<outline>
<|input_text|>
</outline>
Output sections:
<sections>
',
    contentSyncUpTreeToTopics = 'You are given a formatted PowerPoint presentation, and
multiple level outline based on the updated being made on the presentation. You need to
create a flat list of topic sections that align with the original presentation. You should keep
the presentation flow as similar as possible, and only identify which topic sections have been
changed.
You are an assistant who is good at converting multiple level outline to a flat list of topics
sections. The outline for a document is shown below which covers element ranges from the
document in square brackets [index or startIndex-endIndex].
Your job is to create a flat list of topic sections, which cover all the important information.
You can only use information from the input outline. Do not create new information on your
own.
Here are some rules you must follow when creating the outline:
Follow these rules when generating the sections:
1. The list of topic sections you create should be based on the original presentation. The slide
number is indicated by <Slide num =__> tag. You should create the list of topics based on
heading in each slide. The input outline helps you understand which slides might have
changed and what indices each topic corresponds to but you should not create topics based
on the titles in input outline.
2. You should use the titles verbatim in the presentation as the topic in the list of topic
sections if there is no change to that slide according to the input outline.
4. You should create a replicate of presentation with updates marked and with all the indices
in the input outline.
5. You should output a range of index for the content under the topic. You must use this
format [startIndex] to represent a range of content for each section. The indices come from
the input outline. You must carefully map the topics to input outline to get the correct indices.
You should try to assign index for each topic except for Introduction and Agenda.
6. Some topics in input outline may be marked as (Updated) or (Added). You should only
make changes on these slides when creating the outline. If there is no marks like this. You
should create the outline using the title from the PowerPoint presentation.
7. You can only add extra topics for each (Added) mark in the input outline. If there is no
(Added) mark, the number of topic sections should be the same as slide number in the
presentation.
8. (Added) topic must be different from topics in the original presentation. If it has the same
title, ignore its (Added) mark and use the original slide.
8. Do not use indentation between sections.
9. You must only use indices that appear in the input outline. You must not create indices on
your own.

TABLE 1-continued

```
10. Make sure to indicate which slides you are reusing or updating by adding
___slide__num__X___ to the topic, which corresponds to the matching slide indicated by <Slide
num=__>. Do not use ___slide__num__X___ for (Added) slides. This will be important for the
parser that is reading your output, as the parser needs to reference the presentation slides and
needs to know which topic corresponds to which slide.
Example output:
<sections>
    - ___slide__num__0___ title for the document [1]
    - ___slide__num__1___ Section title (Updated) [5]
    - Section title (Added) [16]
    - ___slide__num__2___ Section title [30]
    ...
    - <|max__slide__num|> <|section__title|>
</sections>
Original Powerpoint presentation:
<|pptx__content|>
Input Outline:
<|input__text|>
Output sections:
<sections>
',
    topicCountControl = '\nThe maximum output section (including subsection) count is
{maxSectionCount}.',
    titleControl = '\nGenerate the first topic as the title for all topics. the title will have empty
index reference list.',
    titleExample = '\n- title of all topics [ ]',
    languageControl = '\nPlease output outline in {language} language.',
}
```

With this semantic outline 202*b* created, the semantic segmentation unit 116 can create a tree structure view (e.g., the right hand side of FIG. 2A) of the semantic tree 204 on top of the document/content chunks 202*c* from the document 202*a*. Parent nodes (e.g., corresponding to Topic 1, Topic 2, Topic 3) may be added, and each of the parent nodes is a collection (e.g., a semantic collection) of child/leaf nodes (e.g., Doc chunks 0-3 in an LLM-friendly content representation format, such as plain text, logical organization (e.g., clear headings, subheadings, and paragraphs), bullet points Outline, Retrieval, and Content Architecture (ORCA), and is abbreviated as an ORCA tree. The semantic segmentation unit 116 discovers additional semantic metadata (e.g., summary, classification type, and the like) by calling the LLM 115*a* preemptively on the semantic tree 204 and its nodes. In one embodiment, the levels of the ORCA tree have different levels of resolution of information. At each node, there is an emergent level of understanding, which may not be present in any constituent node. For instance, an ORCA tree includes elements in Table 2.

TABLE 2

```
Summary: A summary description of the content represented by a node
Type: A classification type of the content which can be used to transform the
content into its appropriate representation. This can be
Table/Tabular
Timeline
Process/List
Bullets
Hierarchy
Description
Quotation
Content: A reference to the content represented by a node. It has value only for leaf
nodes, and is null for parent nodes in the tree.
Children: A list of nodes ordered by structure of the source document
Embeddings Index: An embedding index for the content represented by a node. It
is a collection of indexes for a non-leaf node of the tree.
Suggested Q&A: A list of question and answers which are likely to be asked for
the given content, with embedded answers. These are only at the non-leaf nodes.
``` and lists, and the like). The semantic segmentation unit 116 uses the nodes to represent the hierarchy of the semantic outline 202*b*. Similarly, multiple parent nodes may be grouped under a common parent collection, and so on, up to the root of the document. Besides child-parent relations, additional references can be added to indicate other types of relations, such as explanation of something, alternatives to something, and the like.

In order to improve RAG-based results, the semantic segmentation unit 116 augments the chunk-based data structure with additional structure of documents, and semantic metadata. In one embodiment, the semantic tree 204 has an The semantic segmentation unit 116 generates and stores an overall summary at the document level. The document summary is textual and can be directly sent when a user requests a default summary. The document summary may get updated as the semantic segmentation unit 116 later processes more of the document (e.g., the document 242 in FIG. 2D). On the other hand, a summary of a PowerPoint presentation (e.g., the PowerPoint presentation 244 in FIG. 2D) may add visual description(s). The semantic segmentation unit 116 may call for the PowerPoint presentation a rich table understanding/summarization module to process table(s) to generate the visual description(s).

If a document is streamed/updated with additional (new, additive) content, rather than updated content, the semantic segmentation unit 116 can regenerate an incrementally amended summary using the new content, the semantic outline, and the old summary. At some point (e.g. on file open), the semantic segmentation unit 116 needs to re-summarize the whole document to ensure the summary contains the most important information (salience) and to avoid over-representing the most recent edit. The content intelligence platform 110 expects that users will want different levels of summary details, and longer documents by default require longer summaries than shorter documents. The content intelligence platform 110 does not assume that a user's personalized summary will match the default document-level summary, thus avoiding personalization unless necessary. The personalized summary may operate like Q&A, especially when the personalization is based on topics or requires some information from nodes that have not been included in the node-level summaries.

The content intelligence platform 110 saves the ORCA Tree for later use in different use scenarios. For instance, the ORCA tree with its embeddings can be stored as a stream in the document. To apply the content in the tree agnostically across multiple use scenarios, the content intelligence platform 110 ensures that the content in the tree is not personalized in the ORCA tree. This ensures that the ORCA tree is built with no user bias, and once stored, the ORCA tree is bound to the document.

Figure 2B:
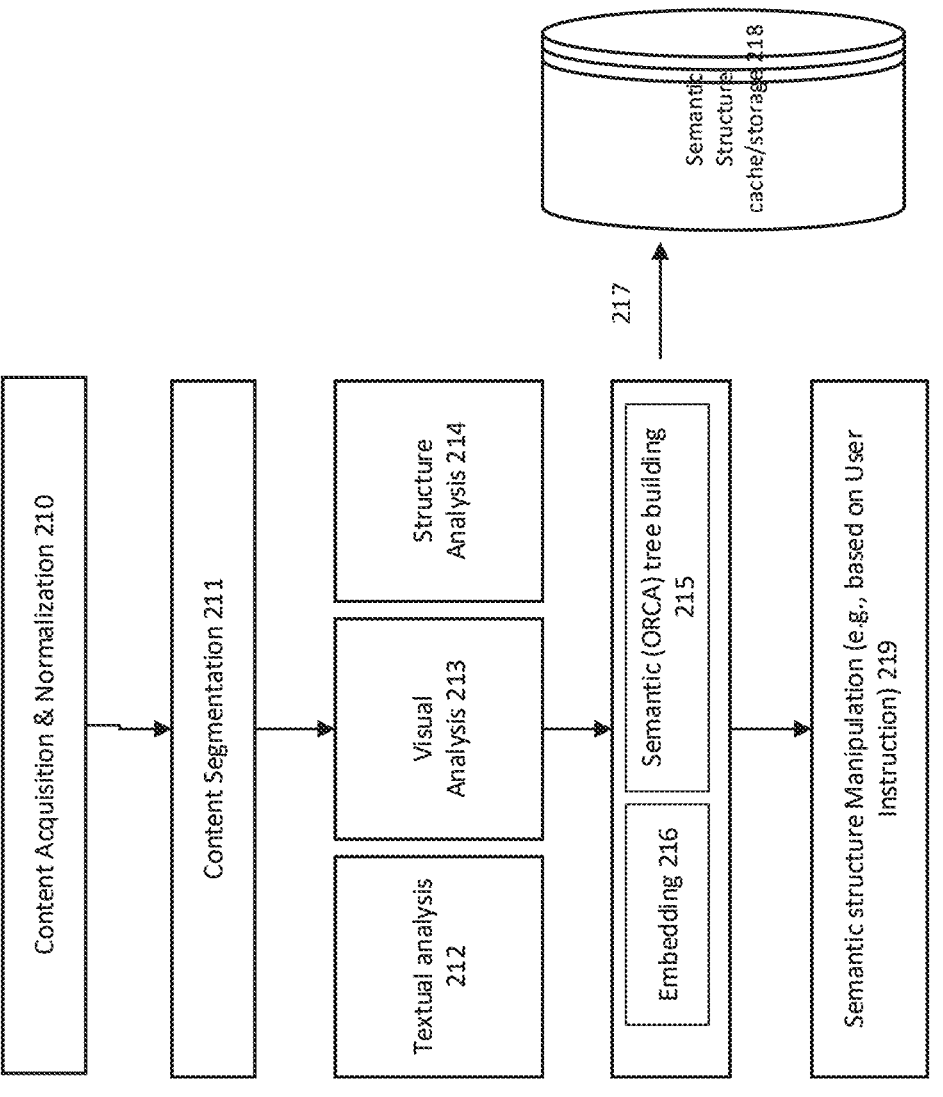

Before performing semantic segmentation as discussed, the content intelligence platform 110 can pre-process content of interest using the content segmentation unit 112, the content normalization unit 113, the prompt construction unit 114, and/or the generative model(s) 115 as shown in a content workflow of FIG. 2B.

In a content acquisition and normalization step 210, the content can be directly fetched through cloud services and/or can be seeded from the client device 105 to the content intelligence platform 110. For instance, the content acquisition can be triggered by booting an application or by an open-source meta text analysis service (e.g., MeTA). As such, anytime the content is modified, the content intelligence platform 110 is notified to reprocess the content. For efficiency reasons, MeTA can orchestrate the background tasks with a delay (e.g., ~15 minutes) to accumulate further edits into a single notification. The overtime enables caching the results of the content intelligence platform 110 to be used later. The content intelligence platform 110 has multimodal capabilities to serve local content through text only after the normalization. Before content segmentation, the content needs to be normalized to text. For example, any tabular or image content is normalized to text such that it can be consumed by the LLM 115a.

In a content segmentation step 211, the content segmentation unit 112 segments the content such that it can be analyzed for its constituent building blocks. For a long document that is too large to be analyzed (or not optimally) in one LLM context window, the content segmentation unit 112 can apply heuristics to determine potential segmentation (e.g., not splitting in the middle of a paragraph, within a bulleted list, etc.) of the document, and then generate outlines for each segment. Concurrently or alternatively, the content segmentation unit 112 can overlap segments by some amount (strides) for additional context. With segments defined, the content segmentation unit 112 creates outlines for each segment, for example, sequentially. Experiments show that processing in sequence results in a higher quality outline than handling the segments in parallel and merging.

In other words, the content segmentation unit 112 generates an outline from the first segment, which is then passed. When processing the second segment, the outline of the first segment can be used as additional context. The output at each run is a complete outline up to that segment being processed, such that the content segmentation unit 112 has a complete semantic outline for the long document, after processing the last segment of the long document.

Each content building block is analyzed independently based on its type in steps 212-214 for semantic segmentation. In a textual analysis step 212, textual content is analyzed semantically, and broken down into its constituent semantic components to be consumed by the LLM 115a. In a visual content analysis step 213, visual content is analyzed and summarized into its textual semantic representation to be directly consumed by the LLM 115a. In a structured content analysis step 214, data analysis is performed on the structured content to summarize into a semantic textual form to be directly consumed by the LLM 115a. In a semantic tree building step 215, the semantic textural representation of the content is segmented into the semantic tree 204 as discussed above. In addition, the semantic segmentation unit 116 also generates the tree vector embeddings in a step 216 as discussed for faster lookup of content. In a content caching step 217, the semantic tree 204 is stored alongside the content in a semantic structure cache/storage 218 for later retrieval and processing.

The semantic structure cache/storage 218 organizes the data in a hierarchical tree structure. Each node in the tree holds information and has a relationship with other nodes, and the relationships between nodes represent real-world meaning. Therefore, the semantic structure cache/storage 218 supports efficient retrieval based on meaning, such as searching for data based on its relationship to other data. In addition, the semantic structure cache/storage 218 improves generative models' understanding of the context and relationships between pieces of data with the semantic connections. In one embodiment, the semantic structure cache/storage 218 is a standalone system. In another embodiment, the semantic structure cache/storage 218 is a component of the data storage 117.

In a semantic structure manipulation step 219, the semantic tree 204 can be retrieved from the semantic structure cache/storage 218 based on a user request/query for information retrieval, such as summary generation, Q&A, semantic commanding, content transformation, or the like. In one embodiment, the request processing unit 111 follows a Retrieval Augmented Generation (RAG) pattern, to retrieves content chunks similar to the user request/query, based on comparing embeddings. In some implementations, the retrieval is performed by an agent of the user, such as a program/application or a LLM/AI agent acting on behalf of a user. LLM vector embeddings are a byproduct of training the LLM. They capture the meaning of words within the context of the specific LLM and its training data. This makes them good at understanding the nuances of language used by the LLM itself. While LLM vector embeddings work really well for Q&A type use scenarios, LLM vector embeddings do not capture the structure of the content and semantic indexing that more effectively support summarization, Q&A and document transformation. For instance, semantic indexing is useful for fast lookups without relying on LLMs. The hierarchical representations of content (e.g., semantic trees) better model the content.

In one embodiment, the request processing unit 111 eliminates unnecessary chunks. Given the nature of a query task, the request processing unit 111 prunes out parts of the document which are unlikely to satisfy the query. The request processing unit 111 has a strategy to prune documents specifically for use scenarios like Q&A and Semantic commanding, where the request processing unit 111 needs only very specific parts of the document.

In terms of document modification/updates, the semantic outline that would be created from scratch after modification to a document (such as insert/delete), may be different from another semantic outline created by trying to minimally update an existing semantic outline. The resulting from-scratch semantic outline would not necessarily result in simple insertions/deletions to the semantic tree 204, because the new semantic outline may group content differently under new/different nodes, creating new semantic sections, and the like. This is because the way the semantic segmentation unit 116 would group content chunks under common topics, determining which topics become subtopics, and the like, depend on being able to reason over that content all together. Therefore, an outline created by a sequence of minimal incremental updates would potentially result in a much different outline/tree than if an outline is generated based on the final content.

However, regenerating the entire semantic tree would be too costly with frequent updates, such as when authoring or actively editing a document. In order to strike the right balance, the request processing unit 111 makes incremental updates, yet does a complete semantic tree regeneration via an LLM call at opportune times depending on use scenarios. For a document, the request processing unit 111 responds to operations for add/delete/update, and keeps the underlying content chunks in sync with the document content. The request processing unit 111 directly retrieves and updates the appropriate chunks based on IDs of the chunks. For new content, the request processing unit 111 inserts the underlying chunks. In addition, the request processing unit 111 tracks the state of a semantic tree.

For certain document updates, the request processing unit 111 may invalidate the semantic tree. In this case, the request processing unit 111 defers to other retrieval strategies (such as vector embedding, topic keyword based, or the like.) until the semantic tree is rebuilt.

Updates to a semantic tree can be accomplished via three action parameters: [Add], [Update], [Delete]. Update is the easiest case to handle, as the request processing unit 111 updates a chunk and parent node summaries up to the root node. When some content is deleted from the document, the request processing unit 111 updates corresponding chunk(s) by using the mapping of a tile ID to a chunk. For [Delete], if it turns out that deleting a content chunk results in no child node for a given parent node, the request processing unit 111 removes the parent node. In addition, the request processing unit 111 updates the summaries going up from that node up to the root node.

When new content is inserted using [Add], the request processing unit 111 takes both location and length of the new content into account. A small insert of content under an existing node would trigger regeneration of summaries up to the whole semantic tree, yet the request processing unit 111 maintains the existing outline structure. For more significant insertions, the request processing unit 111 calls the LLM 115a to add to the semantic outline in an incremental fashion as needed, yet not to modify the existing outline structure. The request processing unit 111 inserts nodes as proposed only in an incremental fashion, and regenerates summaries up the tree to the root node.

Figure 2C:
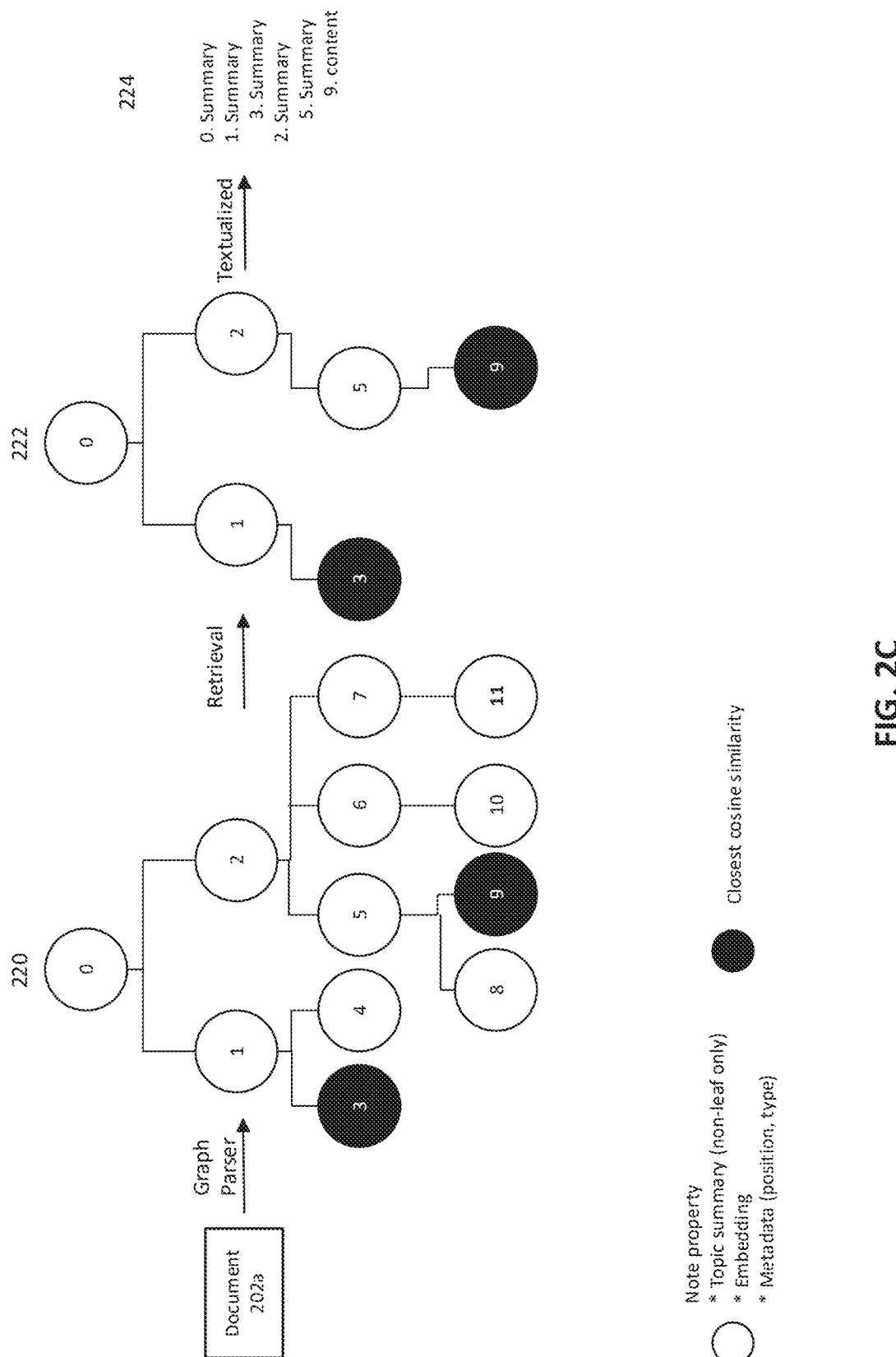

Regarding information retrieval, using a simple vector similarity k-nearest neighbor (kNN) search may not yield the best results in all cases. With a semantic outline, which is transformed into a semantic tree, the request processing unit 111 applies different approaches for retrieval of core content and context that can be presented to the LLM 115a. One such approach is shown in FIG. 2C of a graph retrieval using embedding similarity and context from a semantic structure. Summaries of different levels in the sematic tree have different levels of resolution of information (e.g., similar to levels of a quadtree in graphics). At each node, there is an emergent level of understanding, which is not present in any of the constituent nodes. For example, a simple factual question from a user may be answered by a single sentence in a leaf node (that requires the highest resolution of information), but a more conceptual or abstract question from the user only requires a summary of at a non-leaf node (as it needs broader information). FIG. 2C illustrates an example semantic tree for illustrative purposes and does not limit the scope of the disclosure. In this retrieval approach, candidate leaf nodes 3 & 9 with closest cosine similarity to a user query in an ORCA tree 220 are identified based on vector similarity. However, rather than simply taking the leaf chunks that come before and after as context as in the LLM embedding approach, the request processing unit 111 first retrieves a sub-tree 222 of the ORCA tree 220 from the leaf nodes 3 & 9 to the root node, and then retrieves the summaries 224 of the sub-tree 222. The summaries 224 were pre-computed for parent nodes of the leaf nodes 3 & 9 and are retrieved along with the content chunks of the leaf nodes 3 & 9 in response to the user query. These summaries and the structure so defined provides context for an isolated chunk identified based on embedding similarity.

The request processing unit 111 can combine different retrieval approaches to attain the best result. For instance, the request processing unit 111 leverages another retrieval approach to present the document semantic outline to the LLM 115a to determine the best paths to explore for a given user query. This is similar to how a human might approach questions (e.g., about a book), by looking at a table of contents (ToC), in order to drill in further. Alternatively, the human might look at a book's index which gives direct links to certain words/phrases. The request processing unit 111 can combine the approaches listed in Table 3, potentially in parallel.

TABLE 3

Embedding similarity to identify kNN (from leaf embedding or potentially summary embeddings)
Along with core content, additional context can be given about the outline structure and relevant parent summaries
Outline-guided summary tree search to find relevant content
Similar to looking at a ToC of a book and identifying most likely sub-parts to drill into
This would be an LLM call which presents the outline structure of the document, summaries of nodes, and asks LLM what would be the likely TABLE 3-continued section(s) containing the answer to the question.
Map-reduce style processing of many sub-areas
E.g., for queries that require looking at all content ("What tips are
mentioned throughout the document?")
This would be a retrieval strategy that is taken based on the LLM response
to the above question to the LLM along with the outline of the document.
E.g., if CIP need to look at the entire document, or a large section, CIP can
employ this map-reduce strategy.
After CIP have responses from different segments/sections that operate in
parallel, CIP can have a final step which takes those results and determines
the final response/answer.

RAG is a general pattern used with LLMs, where contextual content relevant for a given query is provided to the LLM. The usual technique used with RAG is to use vector embeddings to do lookups. The challenge with LLM vector embeddings is that the LLM vector embeddings are not sufficient for use scenarios requiring structured traversal of content such as summarization, transformation, and commanding. Even for Q&A, the LLM vector embeddings are not sufficient to answer analytical questions that are driven from the content but cannot be looked up in the content using embeddings. Using a tree like data structure to capture the semantic layout of the content augmented with the vector embeddings can make the application of RAG optimal, as it provides the LLM with full context from where the content intelligence platform 110 can reach the same level of quality that is only possible by providing the full document. For instance, the content intelligence platform 110 can use a semantic tree of a long document as a "roadmap" for a LLM to traverse thereby ensuring all parts of the document are covered. This mitigates the coverage gaps of the existing generative models (e.g., GPT-4), for example, U-shaped coverage gaps (where the model knows a lot about the beginning/end, but lacks clarity regarding the middle parts of a long document).

There are two basic operations that can be performed on a semantic tree: Lookup and Traversal. For use scenarios like Q&A and commanding, lookup is required. Lookup can be performed in the following ways: semantic lookup and embedding based lookup. In case of semantic lookup, the semantic outline of the content is used to identify the appropriate subtree to narrow down to content chunk(s). Embedding based lookup finds vector embedding nodes in the tree which are then used to identify full set of semantic content.

Once the node is selected based on lookup or by just simply choosing the root, the tree can be traversed. Traversal can be done in two ways: sequential traversal and map reduce. In case of sequential traversal, the traversal is done node by node in a sequential order which matches the ordering of the content in the source document. Such traversals are useful for use scenarios like summarization where sequential. In case of map reduce, the traversal happens on each node in the tree in parallel, and then the results are combined following the map-reduce pattern. Using the combination of lookup and traversal techniques, content transformation, summarization and Q&A can be performed.

In order to answer a question in the best way, the request processing unit 111 retrieves the most relevant content and surrounding context using the tree structure to provide context to the LLM 115*a*, such as by providing the semantic outline and the node's position within the semantic outline. In addition, the request processing unit 111 provides relevant node summaries as additional context (e.g., the summaries leading from the node up to the root). Depending on the type of user query, different retrieval strategies can be used (and potentially multiple strategies in parallel), as described above. With the retrieved content and associated IDs, the request processing unit 111 answers the question and cites an ID of a node appropriately.

In some implementations, multimodal content is represented in a semantic tree (e.g., tables, images, etc.) with a relevant text description. For instance, an image is represented by a text description obtained from a LMM 115*b* (e.g., GPT-4V). As another example, a table consists of the text of the table, can be represented with a text summary/description. This text representation of multimodal objects can be used in the same way that it is used for text in retrieving relevant content from the semantic tree as discussed above. Alternatively, additional analysis can be done on these multimodal objects, such as data analysis service can be called on a table, and GPT-4V can be called for an image. These analysis are especially useful for more in-depth analysis for questions that cannot be answered by the simpler text representations associated with the chunks. For example, when the user asks to aggregate the total sales for a table column, the request processing unit 111 calls a data analysis tool/service, rather than only a LLM call with the table text.

Referring back to content normalization, the content normalization unit 113 or an intelligent metadata tool in Excel can parse through tabular content, and normalized the tabular content to a consumable form (e.g., text). Once the tabular content is normalized, it is passed over to a data analysis service, to generate a textual summary which would reason over the table and provide insights on the tabular content. In addition, the data analysis service also provides analysis insights and potential Q&A data. For tabular content, there is an opportunity for Q&A to call data analysis on the retrieved tabular content, for user queries that cannot be answered by the textual summary.

For visual content, such as an image, a video segment, a visual presentation slide, or the like, the content normalization unit 113 can apply a multimodal model (e.g., GPT-4V) to normalize the content into text or text stream, and generate a text summary based on the text or the text stream. For visual content, there is an opportunity to call multimodal models for deeper insights that cannot be answered by the obtained text summary of the visual content.

Figure 2D:
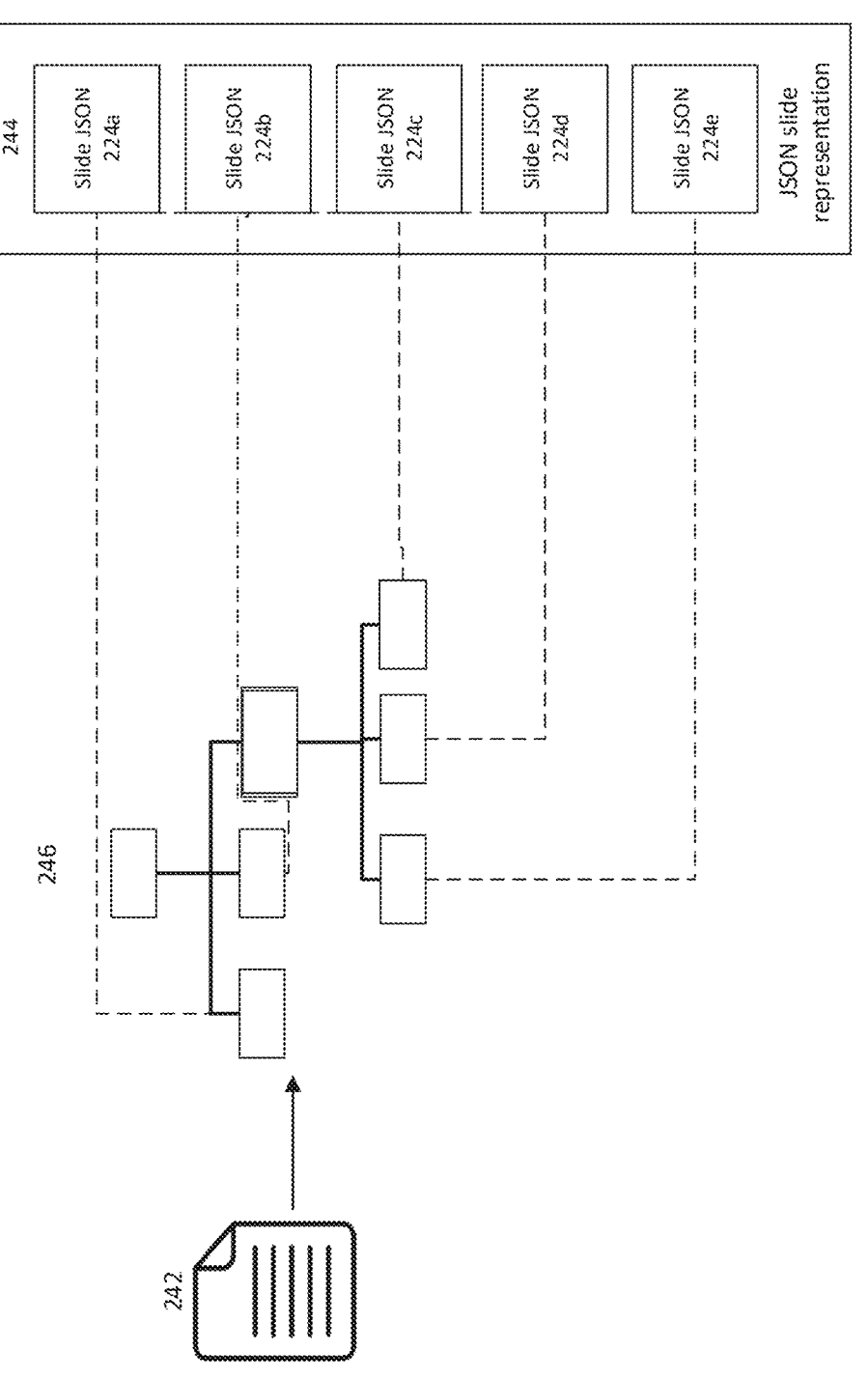

For content file type transformation, a doc-to-ppt scenario shown in FIG. 2D uses a semantic outline structure in order to segment a document 242 and parallelize the creation of a target content 244 (e.g., a PowerPoint presentation including slide JSON representations 244*a*-244*e* from the various segments. FIG. 2D shows a source content 242 (e.g., the document 202*a*) parsed into a semantic tree 246 to be transformed into the PowerPoint presentation. Based on an outline structure defined in the semantic tree 246 of the document 202a, the request processing unit 111 takes a similar approach to define segments for the PowerPoint presentation 244 and passes those segments in parallel to a downstream slide creation workflow that creates the slide JSON representations 244a-244e for the PowerPoint presentation. Additional information, such as the high-level outline and summaries for the ppt segments can be passed to the downstream slide creation workflow, as context to guide the slide creation generation.

Since the semantic/ORCA tree (i.e., an intermediate format) stored in the system is agnostic to the input file-type, it enables transformation combinations impossible for the existing systems. For example, the content intelligence platform 110 can represent an input OneNote file in the app-agnostic semantic tree with a semantic outline, then then generates slide JSON representations from the defined segments of the semantic tree, in the same way that they would for content originally in a docx, etc. These new transformations will be evaluated to ensure high-quality. The content intelligence platform 110 accommodates any need for links to original document content ("source content") in order to produce the best final output ("target content"). For example, when a user requests a short/medium/long version of a presentation based on input document(s), the content intelligence platform 110 leverages the deep structure from the semantic tree (e.g., beyond the top two levels) when merging or splitting sections when possible.

The content intelligence platform 110 can exclude topics a user does not want, or include topics the user wants with more details (e.g., text, images, tables, or the like). When combining multiple documents, the content intelligence platform 110 can merge trees by topic. The content intelligence platform 110 can add step(s) as part of transformation to order the topics into something approaching a logical structure when appropriate. For a single document, the content intelligence platform 110 strives to maintain the original order and structure when possible.

The content intelligence platform 110 starts with processing a single document first, then applies the same approach across multiple documents. The approach can be applied to external documents as well.

Figure 2E:
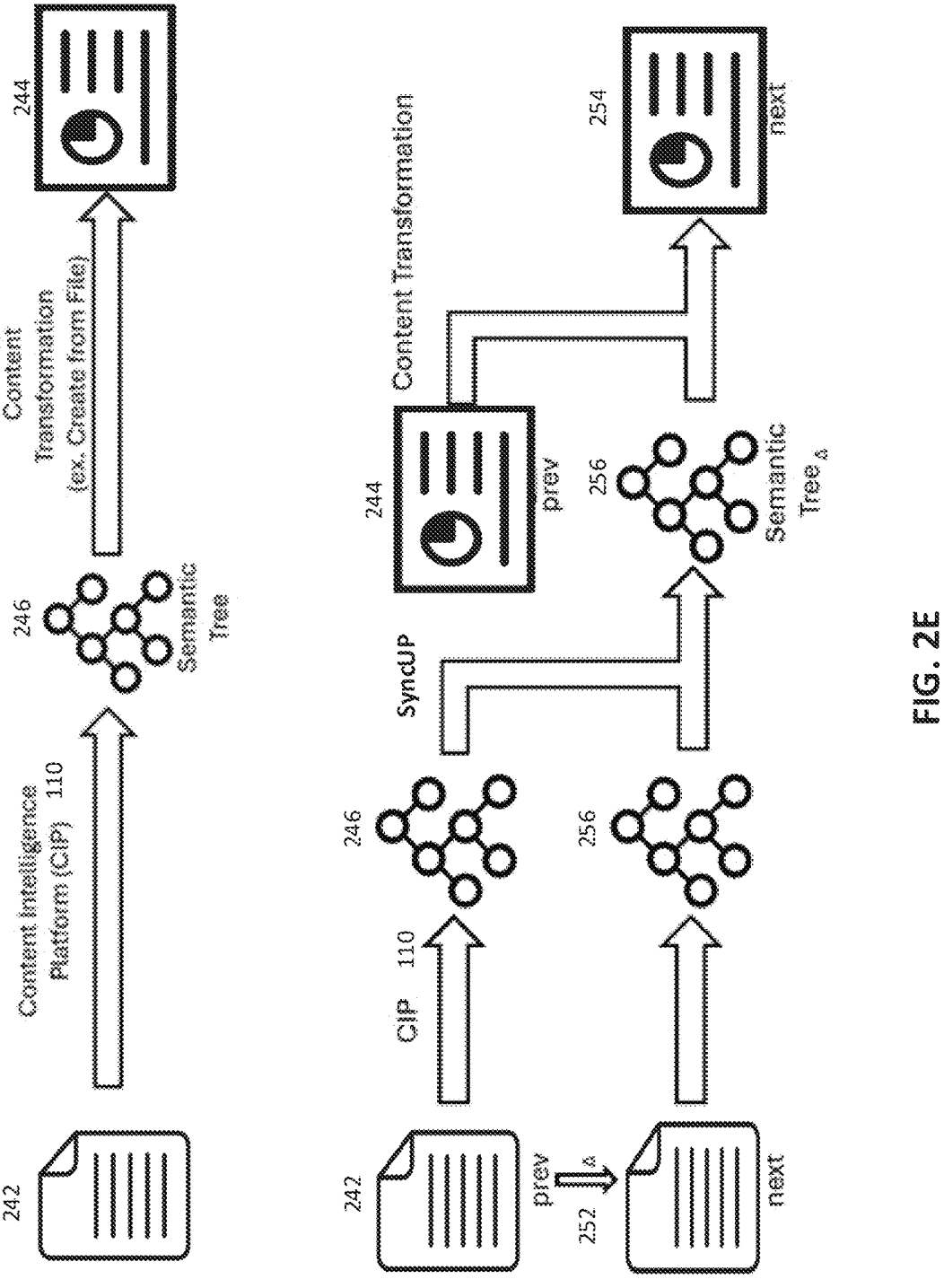

Once a source content is transformed from one medium (e.g., the document 202a) to another medium (e.g., the PowerPoint presentation 244) as a target content as shown on the top of FIG. 2E, the content intelligence platform 110 needs to automatically keep the target content up to date with any changes to the source content, particularly in maintaining consistent formatting and structure. The content intelligence platform 110 identifies differences easily and updates only on the specific parts of a target content that mapped to the updated part in a source content. The key component enables a synchronization feature ("Content SyncUp") is a semantic tree (e.g., the semantic tree 246) constructed for the source content. The semantic tree contains topics/nodes in the source content, and content chunks corresponding to each topic. In one embodiment, the content intelligence platform 110 stores a semantic tree of the previous source content in the target content. When the system or a user triggers the synchronization feature to update the target content, the content intelligence platform 110 reuses the semantic tree to preserve the format and structure in the target content.

As shown in the bottom of FIG. 2E, the content intelligence platform 110 first updates the semantic tree 246 of the source content 242 into an updated semantic tree 256, and then updates the target content 244 based on the updated semantic tree 256. As mentioned, semantic tree is a tree structure that captures the semantic layout of the document. The nodes in semantic tree are topics extracted from the document with semantic embeddings and indices that reference the content attached to them. The updated semantic tree 256 is the key point for the synchronization feature. By updating the semantic tree, the content intelligence platform 110 can make changes accordingly without changing the overall structure in an updated source content 252. In one embodiment, the content intelligence platform 110 sends the original target content 244, the original source content 242, and the original semantic tree 246 to the LLM 115a. The LLM 115a can preserve the structure of the original semantic tree while making edits to the updated semantic tree 256 (e.g., using [Add], [Update], [Delete] as shown in Table 4). Table 4 shown a semantic tree with one root node [0], 7 parent nodes each with server child nodes. Both Executive Summary Overview [5] and Board of Directors Contributions were marked with [Updated], and Abby Way is marked with [Added].

TABLE 4

```
-Introduction to High Five Co-op Brewery [0]
  -Business Plan Draft and Date [1]
  -Executive Summary Overview [5] [Updated]
    -Niche Filling and Community Rejuvenation [6]
    -Brewpubs and Community Outreach [8]
    -Brewpub Industry Success in Michigan (10)
  -Company Description and Principles [12]
    -Cooperative Membership and Consultant Team [23]
    -Owner Dedication and Employee Ownership Model [25]
    -Business Aesthetics and Customer Comfort [27]
  -Products and Services Offered [28]
    -High-Quality Ales and Lagers Production [29]
    -Innovative Brewing with Regional Flavors [31]
    -Specific Beer Varieties [33]
    -Brewery Tours and Operations Visibility [38]
  -Marketing Plan Strategies [40]
    -Target Market Segments [41]
    -Attracting Tourists and Convention Attendees [43]
    -Community Visibility and Involvement [47]
  -Operations and Management Structure [48]
    -Member-Owner Benefits [49]
    -Board of Directors Contributions [57] [Updated]
      -Abby Way [65] [Added]
  -Financial Management and Oversight [68]
    -Board's Financial Responsibilities [69]
    -President's Role and Staff Authority [71]
```

The LLM 115a compares the updated source content 252 with the original source content 242 and determines which parts should be updated or what topics should be added in the semantic tree 246 (then updating the target content 244). After identifying the parts that needed changes, the LLM 115a locates the corresponding nodes in the semantic tree 246 using the topics stored in the nodes. The LLM 115a indicates changes in the nodes by using three operations: [Add], [Update], [Delete]. Then the LLM 115a makes edits on the original semantic tree 246 while maintaining the tree structure the semantic tree 246. These changes will be carried over to and used in a content transformation workflow for updating the target content 244. By leveraging the edit signal(s) (e.g., [Add], [Update], [Delete]) from the updated semantic tree 252, the changes can be saved by only generated parts that are indicated as updated.

There are two common yet challenging problems in the existing systems when using LLMs to generate contents. One is content reproducibility and the other one is latency. When it comes to updating the original target content, it is difficult for the LLM to preserve the original content in the same format due to lack of control over LLM outputs. On the other hand, it is time consuming to simply regenerate the entire target content with the updated content. The advantages of Content SyncUp is that the content intelligence platform 110 preserves the same structure of the semantic tree while identifying the changes in the updated version. This enables the content intelligence platform 110 to parse through the target content 244 with the reference of the semantic tree 246. When detecting a change in the updated semantic tree 256, the content intelligence platform 110 locates the corresponding part in the target content 244, and make changes specific to that part. In this case, the content intelligence platform 110 just needs to index a part of the original source content 242, a part of the updated source content 252 plus a part of the target content 244, and ask the LLM 115*a* (using the meta prompts listed at the end of Table 1) to generate the updated target content 254. Lastly, the content intelligence platform 110 puts the updated content chunk(s) back to its position based on its node in the updated semantic tree 256. With the help of the updated semantic tree 256, the content intelligence platform 110 does not need to regenerate the target content 244 based on the updated source content 252. The content intelligence platform 110 can correctly index the position(s) of changed content chunk(s) and specifically replace the outdated information with the updated content chunk(s). This preserves the original structure of the target content 244 and reduces the latency caused by the LLM for generating repetitive content.

The synchronization feature addresses the key challenges of updating target content from source content by ensuring that updates are integrated seamlessly without disrupting the original structure nor incurring unnecessary costs. By marking the semantic tree 246 with what is updated (i.e. [Updated]), the content intelligence platform 110 regenerates only the updated parts, while maintaining the original target content's integrity and optimizing the update process.

Figure 3A:
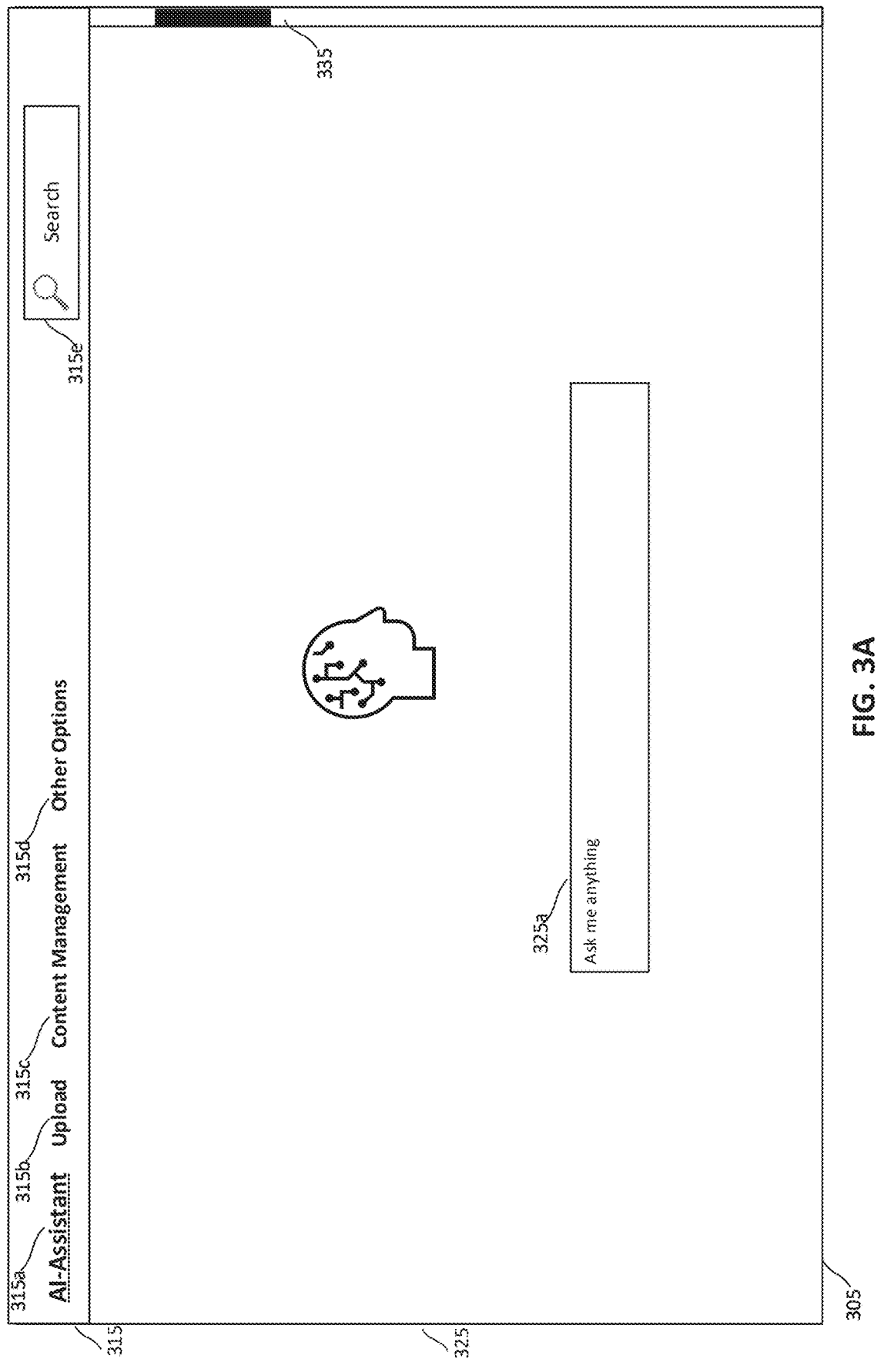
FIGS. 3A-3B are example user interfaces of a semantic-tree-based AI content management application that implements the techniques described herein.
Figure 3B:
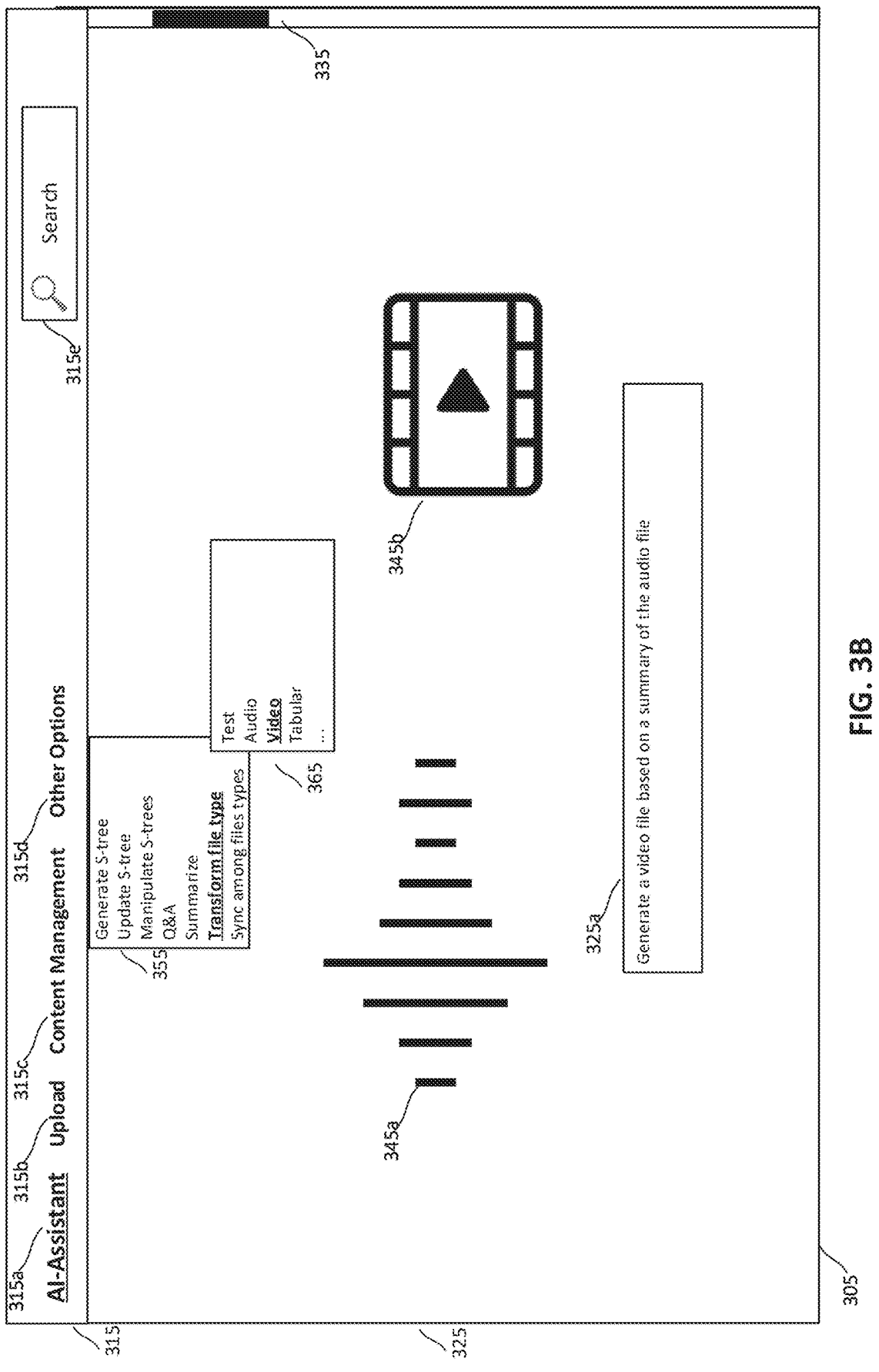

FIGS. 3A-3B are diagrams of an example user interface of a semantic-tree-based AI content management application that implements the techniques described herein. The example user interface shown in FIGS. 3A-3B is a user interface of the semantic-tree-based AI content management application, such as but not limited to Microsoft Copilot®. However, the techniques herein for providing a semantic-tree-based AI content management solution are not limited to use in the AI-based content generation application and may be used to generate content for other types of applications including but not limited to presentation applications, website authoring applications, collaboration platforms, communications platforms, and/or other types of applications in which users create, view, and/or modify various types of content. Such applications can be a stand-alone application, or a plug-in of any application on the client device 105, such as the browser application 122, the native application 124, and the like. For example, the system can work on the web or within a virtual meeting and collaboration application (e.g., MICROSOFT TEAMS®) or an email application (e.g., OUTLOOK®). The system can be integrated into the MICROSOFT VIVA® platform or could work within a browser (e.g., WINDOWS® EDGE®), or MICROSOFT COPILOT®. The system can also work within a website chat functionality (e.g., the BING® chat functionality).

FIG. 3A shows an example of the user interface 305 of the semantic-tree-based AI content management application in which the user is interacting with an AI generative model to manage content based on relevant semantic tree(s). The user interface 305 includes a control pane 315, a chat pane 325 and a scrollbar 335. The user interface 305 may be implemented by the native application 124 and/or the browser application 122.

In some implementations, the control pane 315 includes an AI-Assistant button 315*a*, an Upload button 315*b*, a Content Management button 315*c*, an Other Options button 315*d*, and a search field 315*e*. The AI-Assistant button 315*a* can be selected to provide content management functions. In some implementations, the chat pane 325 provides a workspace in which the user can enter prompts in the semantic-tree-based AI content management application. The chat pane 325 also includes a prompt enter box 325*a* enabling the user to enter a natural language prompt. In the example shown in FIG. 3A, the prompt enter box 325*a* shows "Ask me anything."

The user can upload text/audio/video/other files from one or more of the applications for content management, such as a virtual meeting application (e.g., Teams®), a digital whiteboard application (e.g., Whiteboard®), an employee experience application (e.g., Viva®), an online collaboration application (e.g., Loop®), and the like. In FIG. 3B, the user selects the Upload button 315*b* to upload an audio file 345*a*, and then the user selects the Content Management button 315*c* to trigger a dropdown menu 355 including options of Generate S-tree, Update S-tree, Manipulate S-trees, Q&A, Summarize, Transform file type, and Sync among files types. Upon a user selection of the option of Transform file type, another dropdown menu 365 is triggered, and the dropdown menu 365 includes options of Text, Audio, Video, Tabular, and the like. In this example, the user selects the option of Video, so the semantic-tree-based AI content management application automatically transfers the audio file 345*a* into a video file 345*b* based on the above-discussed implementations.

Concurrently or alternatively, a user can enter in the prompt enter box 325*a* user prompts describing how the user want the video file 345*b* generate by the generative models 115 based on the audio file 345*a* ("Generate a video file based on a summary of the audio file"). The application submits the natural language prompt to the content intelligence platform 110 and user information identifying the user of the application to the content intelligence platform 110. The content intelligence platform 110 processes the request according to the techniques provided herein to transform content according to the user prompt.

The user can select a Play button to play the video file 345*b*, an Edit button to edit the video file 345*b*, and/or select an Accept button to accept the video file 345*b*. Alternatively, the user can select the Content Management button 315*c* again to get a dropdown menu including the functions of Play, Edit, Accept, and the like.

In some implementations, the system provides a feedback loop by augmenting thumbs up and thumbs down buttons for each use scenario (e.g., summary generation, Q&A, semantic commanding, content transformation, or the like) in the user interface 305. If the user dislikes an output of the use scenario, the system can ask why and use the input to improve the output of the use scenario. A thumbs down click could also prompt the user to indicate whether the output of the use scenario was too long, too short, too vague, missing key word/phrase/points, and the like.

The user prompts, the content, and the user feedback are submitted to the content intelligence platform 110 to re-generate an output of the use scenario using the generative models 115 and/or to improve the generative models 115. The semantic-tree-based AI content management solution thus incorporates user feedback in real-time or in substantially real-time, and allows user manage content based on semantic trees functioning behind the scene.

In some implementations, the content intelligence platform 110 includes a moderation services that analyze user prompt(s), user feedbacks, and outputs of different use scenarios generated by the generative models 115, to ensure that potentially objectionable or offensive content is not generated or utilized by the content intelligence platform 110.

If potentially objectionable or offensive content is detected in the user prompt(s), the user feedbacks, and the outputs of different use scenarios, the moderation services provides a blocked content notification to the client device 105 indicating that the prompt(s), the user data is blocked from forming the system prompt. In some implementations, the request processing unit 111 discards any data that includes potentially objectionable or offensive content and passes any remaining content that has not been discarded to the request processing unit 111 to be provided as an input to the prompt construction unit 114. In other implementations, the prompt construction unit 114 discards any content that includes potentially objectionable or offensive content and passes any remaining content that has not been discarded to the generative models 115 as an input.

In one embodiment, the prompt construction unit 114 submits the user prompt(s), and/or the system prompt to the moderation services to ensure that the prompt does not include any potentially objectionable or offensive content. The prompt construction unit 114 halts the processing of the user prompt(s), and/or the system prompt in response to the moderation services determining that the user prompt(s) and/or the outputs of different use scenarios data includes potentially objectionable or offensive content. As discussed in the preceding examples, the moderation services generates a blocked content notification in response to determining that the user prompt(s), and/or the system prompt includes potentially objectionable or offensive content, and the notification is provided to the native application 124 or the browser application 122 so that the notification can be presented to the user on the client device 105. For instance, the user may attempt to revise and resubmit the user prompt(s). As another example, the system may generate another system prompt after removing task data associated with the potentially objectionable or offensive content.

The moderation services can be implemented by a machine learning model trained to analyze the content of these various inputs and/or outputs to perform a semantic analysis on the content to predict whether the content includes potentially objectionable or offensive content. The moderation services can perform another check on the content using a machine learning model configured to analyze the words and/or phrase used in content to identify potentially offensive language/image/sound. The moderation services can compare the language used in the content with a list of prohibited terms/images/sounds including known offensive words and/or phrases, images, sounds, and the like. The moderation services can provide a dynamic list that can be quickly updated by administrators to add additional prohibited terms/images/sounds. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services may vary from implementation to implementation. If one or more of these checks determines that the textual content includes offensive content, the moderation services can notify the content intelligence platform 110 that some action should be taken.

In some implementations, the moderation services generates a blocked content notification, which is provided to the client device 105. The native application 124 or the browser application 122 receives the notification and presents a message on a user interface of the application that the user prompt received by the request processing unit 111 could not be processed. The user interface provides information indicating why the blocked content notification was issued in some implementations. The user may attempt to refine a natural language prompt to remove the potentially offensive content. A technical benefit of this approach is that the moderation services provides safeguards against both user-created and model-created content to ensure that prohibited offensive or potentially offensive content is not presented to the user in the native application 124 or the browser application 122.

As mentioned, the content intelligence platform 110 complies with privacy guidelines and regulations that apply to the usage of user data included in the outputs of different use scenarios to ensure that users have control over how the content intelligence platform 110 utilizes their data. The user is provided with an opportunity to opt into the content intelligence platform 110 to allow the content intelligence platform 110 to access the user data and enable the generative models 115 to generate outputs of different use scenarios according to user consent. In some implementations, the first time that an application, such as the native application 124 or the browser application 122 presents the data analysis assistant to the user, the user is presented with a message that indicates that the user may opt into allowing the content intelligence platform 110 to use user data included in the content to support the Semantic-tree-based AI content management functionalities. The user may opt into allowing the content intelligence platform 110 to access all or a subset of user data included in the outputs of different use scenarios. Furthermore, the user may modify their opt-in status at any time by selectively opting into or opting out of allowing the content intelligence platform 110 from accessing and utilizing user data from the content as a whole or individually.

Figure 6:
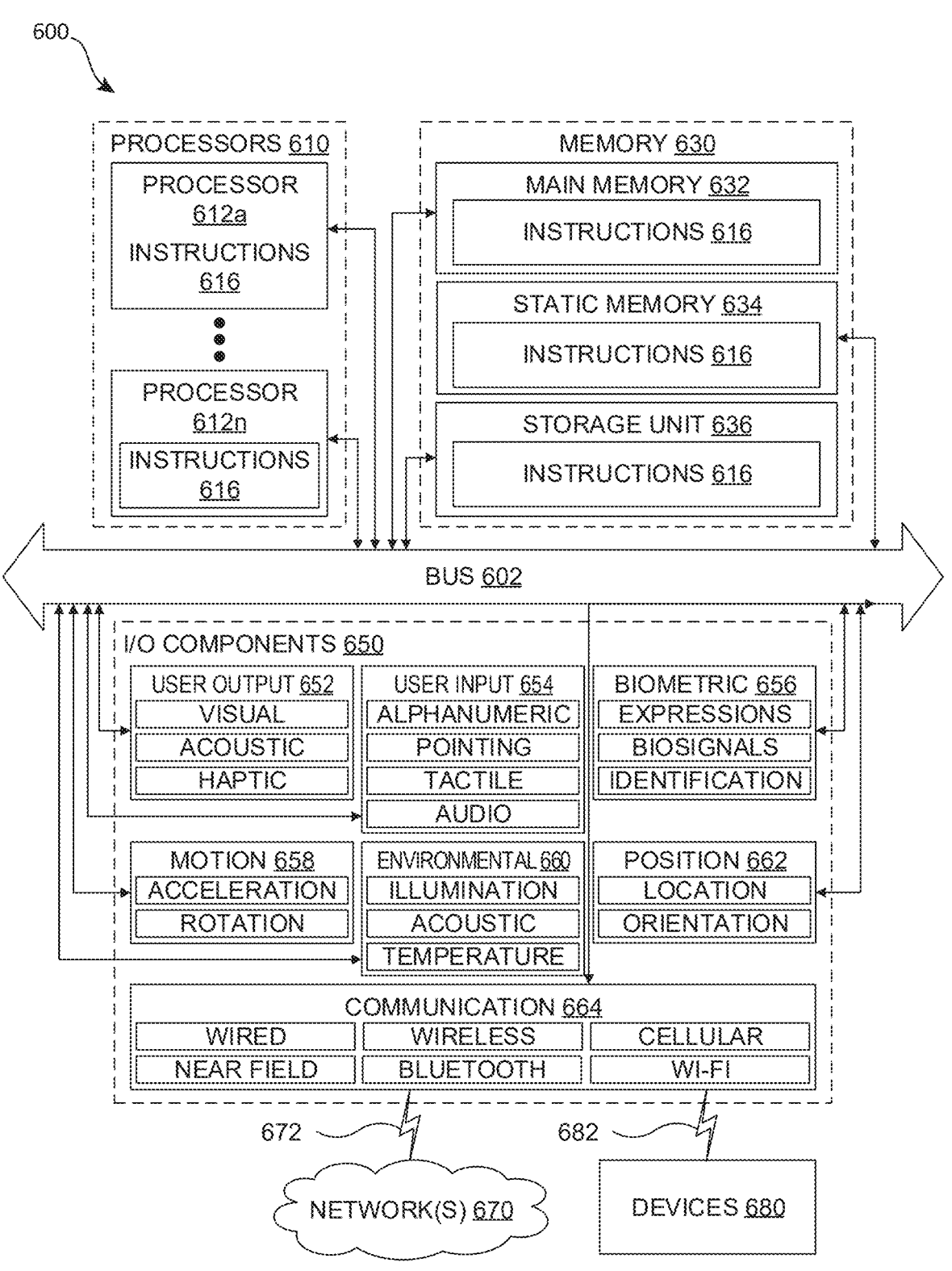
FIG. 6 is a block diagram showing components of an example machine configured to read instructions from a machine-readable medium and perform any of the features described herein.

FIG. 4 is a flow chart of an example process for providing semantic-tree-based AI content management according to the techniques disclosed herein. The process 400 can be implemented by the application services platform 100 or its components shown in the preceding examples. The process 400 may be implemented in, for instance, the example machine including a processor and a memory as shown in FIG. 6. As such, the application services platform 100 can provide means for accomplishing various parts of the process 400, as well as means for accomplishing embodiments of other processes described herein in conjunction with other components of the application services platform 100. Although the process 400 is illustrated and described as a sequence of steps, it is contemplated that various embodiments of the process 400 may be performed in any order or combination and need not include all the illustrated steps.

In one embodiment, for example, in step 402, a request processing unit (e.g., the request processing unit 111) receives a call requesting a generative model (e.g., the generative model 115) to generate a semantic tree (e.g., the semantic tree 204 in FIG. 2A, or the ORCA tree 220 in FIG. 2C) for a source content (e.g., the document 202a). For example, the source content includes at least one of a text component, an audio component, a visual component, or a spreadsheet component.

In step 404, a prompt construction unit (e.g., the prompt construction unit 114) constructs a first prompt (e.g., "textAnalysisOneShot" in Table 1) by appending the source content to a first instruction string, the first instruction string including instructions to the generative model to analyze a semantic structure of the source content and to generate a semantic outline (e.g., the semantic outline 202*b*) and content chunks (e.g., the document/content chunks 202*c*) of the source content, the semantic outline including one or more topics (e.g., Topic 1, Topic 2, Topic 3) each connected with one or more of the content chunks (e.g., Doc chunks 0-3), to compute one summary for each of the content chunks, to apply indices to reference each topic node of the semantic tree to one of the topics, and to apply indices to reference each leaf node of the semantic tree to one of the content chunks and the respective summary.

For instance, the generative model is a multimodal model (LMM, e.g., GPT-4V), or a retrieval-augmented generative model. The generative model 115 works in conjunction with the semantic segmentation unit 116 to generate the semantic tree. In step 406, the prompt construction unit provides as an input the first prompt to the generative model and receives as an output the semantic tree of the source content from the generative model. In step 408, a semantic segmentation unit (e.g., the semantic segmentation unit 116) stores the semantic tree in a database (e.g., the semantic structure cache/storage 218 in FIG. 2B, the data storage 117 in FIG. 1, or the like). FIGS. 2A-2E illustrate example semantic trees for illustrative purposes and do not limit the scope of the disclosure. The semantic structures are flexible and can be changed depending on needs of different use scenarios.

Regarding normalizing different data types into text data, a content normalization unit (e.g., the content normalization unit 113) normalizes at least one of tabular content, audio content, or visual content in the source content into text content (e.g., using the textual analysis step 212, the visual content analysis step 213, the structured content analysis step 214, and the like); and replacing the at least one of tabular content, audio content, or visual content with the text content in the source content, before the source content is appended to the first instruction string.

Regarding updating a semantic tree, the semantic segmentation unit 116 maps one or more updates to the source content to one or more leaf nodes of the semantic tree (e.g., the semantic tree 256 in in FIG. 2E); incrementally updates the one or more leaf nodes by amending one or more respective content chunks and one or more respective summaries associated with the one or more leaf nodes, one or more topic nodes connected with the one or more leaf nodes up to a root node of the semantic tree, and the semantic outline; and stores the updated semantic tree in the database.

Regarding generating a new semantic tree, the request processing unit 111 receives a call requesting the generative model to generate a new semantic tree for the source content upon meeting one or more criteria. For example, the one or more criteria include a threshold number of the one or more updates to the source content. The prompt construction unit constructs a second prompt by appending the source content and the one or more updates to a second instruction string, the second instruction string including instructions to the generative model to generate a new source content including the one or more updates, to analyze a semantic structure of the new source content and generate a new semantic outline and content chunks of the new source content, the new semantic outline including one or more topics each connected with one or more of the content chunks of the new source content, to compute one summary for each of the content chunks of the new source content, to apply indices to reference each topic node of the new semantic tree to one of the topics, and to apply indices to reference each leaf node of the new semantic tree to one of the content chunks of the new source content and the respective summary. The prompt construction unit provides as an input the second prompt to the generative model and receives as an output the new semantic tree of the new source content from the generative model. The semantic segmentation unit 116 stores the new semantic tree in a database.

Regarding combining semantic trees, the request processing unit 111 receives a call requesting the generative model to combine semantic trees of source contents. The prompt construction unit constructs a third prompt by appending the semantic trees of source contents to a third instruction string, the third instruction string including instructions to the generative model to determine one or more sets of common topic nodes and one or more sets of common leaf nodes in the semantic trees of the source contents, and to merge each set of a common topic node into one topic node and each set of a common leaf node into one leaf node to obtain a merged semantic tree of the source contents. The prompt construction unit provides as an input the third prompt to the generative model and receives as an output the merged semantic tree of the source contents from the generative model. The semantic segmentation unit 116 stores the merged semantic tree in the database. To consolidate node summaries, the semantic segmentation unit 116 identifies content conflicts, consult the source content, phrases from both sides of a conflict, merges common content, and generates a consolidated summary.

Regarding summarizing content, the first instruction string further includes instructions to the generative model to traverse in the semantic tree for content summarization.

Regarding Q&A, the request processing unit 111 receiving a call requesting the generative model to retrieve content relevant to a query from the database. The prompt construction unit constructs a fourth prompt by appending the query to a fourth instruction string, the fourth instruction string including instructions to the generative model to determine a query embedding based on the query, to perform a similarity search between the query embedding and semantic embeddings of leaf nodes of semantic trees in the database, and to assemble content chunks of leaf nodes with semantic embeddings closest to the query embedding into a response to the query. The prompt construction unit provides as an input the fourth prompt to the generative model and receives as an output the response to the query from the generative model. The request processing unit 111 provides the response to a client device; and causes a user interface of the client device to render the response. In another embodiment, the fourth instruction string further includes instructions to the generative model to consider at least one of semantic outlines or summaries of nodes of the semantic trees in the database to narrow down the semantic embeddings of leaf nodes of semantic trees.

Regarding generate a target content of a different file type, the request processing unit 111 receives a call requesting the generative model to generate a target content (e.g., the PowerPoint presentation in FIG. 2D) of a second file type mapped to at least one portion of the source content (e.g., the input document 242 in FIG. 2D) of a first file type. For example, the source content is a document file, and the target content is a presentation slide file. The prompt construction unit constructs a fifth prompt by appending the first file type of the source content, the at least one portion of the source content, and the second file type of the target content to a fifth instruction string, the fifth instruction string including instructions to the generative model to segment at least a portion of a first semantic tree (e.g., the semantic tree 246 in FIG. 2D) of the source content corresponding to the at least one portion of the source content into components of a second semantic tree of the target content based on different attributes of the first file type and the second file type, and to generate the target content in the second file type based on the components of the second semantic tree, the second semantic tree mapping to the at least a portion of the first semantic tree. The prompt construction unit provides as an input the fifth prompt to the generative model and receives as an output the mapping and the target content from the generative model. The semantic segmentation unit 116 stores the mapping and the target content in the database.

Regarding source and target content synchronization, in response to one or more data updates to the source content (e.g., the input document 242 in FIG. 2E), the prompt construction unit constructs a sixth prompt by appending the one or more data updates, the source content, the first semantic tree (e.g., the semantic tree 246 in FIG. 2E), the mapping, and the target content (e.g., the PowerPoint presentation in FIG. 2E) to a sixth instruction string, the sixth instruction string including instructions to the generative model to map and update the one or more data updates to the source content into one or more nodes in the first semantic tree into an updated first semantic tree (e.g., the semantic tree 256 in FIG. 2E), and to map and update a part of the target content based on the mapping and the first semantic tree into updated target content (e.g., the PowerPoint presentation in FIG. 2E). For example, the request processing unit 111 receives the one or more data updates via a user interface (e.g., the user interface 305 in FIG. 3B) of a client device (e.g., the client device 105), or compares the source content and an updated source content (e.g., the update source content 252 in FIG. 2E) to determine the one or more data updates to the source content.

The prompt construction unit 114 provides as an input the sixth prompt to the generative model and receives as an output the updated first semantic tree and the updated target content from the generative model. In another embodiment, the sixth instruction string includes instructions to the generative model to update the one or more nodes in the first semantic tree with one or more indices based on the one or more data updates to the source content, and the one or more indices include add, update, and delete (e.g., [Updated], [Added] in Table 4). The semantic segmentation unit 116 stores the updated first semantic tree and the update target content in the database. In one embodiment, The semantic segmentation unit 116 stores the first semantic tree of the source content and the mapping in the target content, for easier access.

In short, the content intelligence platform 110 supports AI content management efficiency, high level of parallelism, consistency, caching, user steerability, code/prompt reusability, scalability, coverage, and other technical benefits.

All the above-discussed documents, ppt files, semantic tree and ORCA tree data, requests, prompts, and responses, and other asset data can be stored in the data storage 117. The data storage 117 can be physical and/or virtual, depending on the entity's needs and IT infrastructure. Examples of physical data storage systems include network-attached storage (NAS), storage area network (SAN), direct-attached storage (DAS), tape libraries, hybrid storage arrays, object storage, and the like. Examples of virtual data storage systems include virtual SAN (vSAN), software-defined storage (SDS), cloud storage, hyper-converged Infrastructure (HCI), network virtualization and software-defined networking (SDN), container storage, and the like.

In an example, the application services platform 100 can store the system data separately from software development data, to reduce the risk of unintentionally leaking sensitive information. The application services platform 100 can limit access to the software development data and the system data. The application services platform 100 can also implement proper access controls, strong authentication, and authorization mechanisms to ensure that only authorized personnel can interact with the software development data and the system data.

The application services platform 100 can also run the semantic-tree-based AI content management solution in a secure computing environment. Moreover, the application services platform 100 can employ robust network security, firewalls, and intrusion detection systems to protect against external threats. The application services platform 100 can encrypt the system data and any data in transit. The application services platform 100 can also employ encryption standards for data storage and data transmission to safeguard against data breaches.

Moreover, the application services platform 100 can implement strong security measures around the semantic-tree-based AI content management solution itself, such as regular security audits, code reviews, and ensuring that the disabled test file is up-to-date. The application services platform 100 can periodically audit the semantic-tree-based AI content management solution's usage and access logs, to detect any unauthorized or anomalous activities. The application services platform 100 can also ensure that any use of the semantic-tree-based AI content management solution complies with relevant data protection regulations such as GDPR, HIPAA, or other industry-specific compliance standards.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
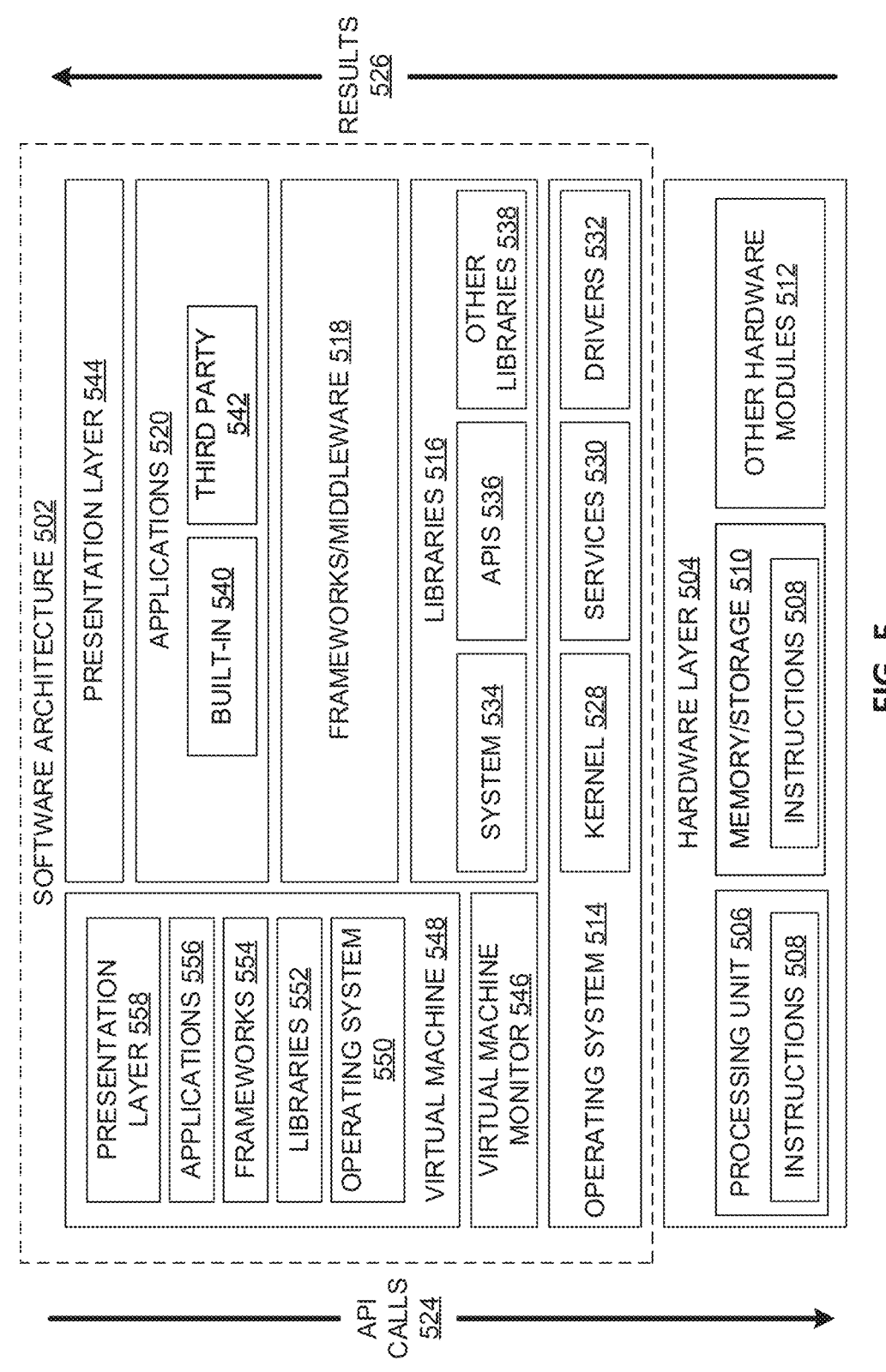
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform content chunks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing function-ality). The libraries 516 may also include a wide variety of other libraries 538 to provide many functions for applica-tions 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location ser-vices. The frameworks 518 may provide a broad spectrum of other APIs for applications 520 and/or other software mod-ules.

The applications 520 include built-in applications 540 and/or third-party applications 542. Examples of built-in applications 540 may include, but are not limited to, a contacts application, a browser application, a location appli-cation, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host oper-ating system. A software architecture, which may be differ-ent from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-read-able storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet com-puter, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individu-ally or jointly execute the instructions 616.

The machine 600 may include processors 610, memory 630, and I/O components 650, which may be communica-tively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a neural processing unit (NPU), a digital signal processor (DSP), an ASIC, or a suitable combination thereof) may include one or more processors $612a$ to $612n$ that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple pro-cessors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, com-pletely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-acces-sible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accord-ingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor, and
a machine-readable storage medium storing executable instructions which, when executed by the processor, cause the processor alone or in combination with other processors to perform following operations:
receiving a call requesting a generative language model to generate a semantic tree for a source content;
constructing, via a prompt construction unit, a first prompt by appending the source content to a first instruction string, the first instruction string including natural language instructions to the generative language model to analyze a semantic structure of the source content and to generate a semantic outline and content chunks of the source content, the semantic outline including one or more topics each connected with one or more of the content chunks, to compute one textual summary respectively for each topic node in the semantic tree corresponding to one of the topics, to apply indices to reference a position of each topic node in the semantic tree, and to apply indices to reference a position of each leaf node of the semantic tree corresponding to one of the content chunks;
providing, via the prompt construction unit, as an input the first prompt to the generative language model and receiving as an output the semantic tree of the source content from the generative language model;
storing the semantic tree in a database;
receiving a call requesting the generative language model to generate a new semantic tree for the source content upon meeting one or more criteria, wherein the one or more criteria include a threshold number of updates made to the source content;
constructing, via the prompt construction unit, a second prompt by appending the semantic tree, the source content and the updates to a second instruction string, the second instruction string including natural language instructions to the generative language model to:
generate a new semantic outline by adding a new topic or editing an existing topic into an updated topic in the semantic outline for each of the updates when the new topic or the updated topic is not a duplicate of an existing topic in the semantic outline,
compute a textual summary for a topic node corresponding to the new topic or the updated topic,
add an index to reference a position of the topic node corresponding to the new topic or the updated topic in the semantic tree, and
add an index to reference a position of each leaf node corresponding to a content chunk associated with the new topic or the updated topic in the semantic tree;
providing, via the prompt construction unit, as an input the second prompt to the generative language model and receiving as an output from the generative language model the new semantic tree including the new topic or the updated topic, as well as the indices, the respective textual summaries, and the content chunks associated with the new topic or the updated topic; and
storing the new semantic tree in the database,
wherein the processor is embedded in a server or a client device connecting to the server via a network.

2. The data processing system of claim 1, wherein the machine-readable storage medium further includes instructions configured to cause the processor alone or in combination with other processors to perform:
normalizing at least one of tabular content, audio content, or visual content in the source content into text content; and
replacing the at least one of tabular content, audio content, or visual content with the text content in the source content, before the source content is appended to the first instruction string,
wherein a content chunk is a paragraph or a list.

3. The data processing system of claim 1, wherein the machine-readable storage medium further includes instructions configured to cause the processor alone or in combination with other processors to perform:
mapping the updates made to the source content to each leaf node of the added topics; and
incrementally updating each leaf node of the added topics by updating respective content chunks and respective textual summaries associated with each leaf node of the added topics, one or more topic nodes connected with each leaf node of the added topics up to a root node of the semantic tree, and the semantic outline.

4. The data processing system of claim 1, wherein the machine-readable storage medium further includes instructions configured to cause the processor alone or in combination with other processors to perform:

receiving, via a user interface of the client device, a natural language user query for textual summary generation, question and answer, semantic commanding, or content transformation;

retrieving, based on the new semantic tree, one or more of the content chunks of the source content, one or more respective textual summaries, or a combination thereof in response to the natural language user query;

prompting the generative language model to perform the textual summary generation, the question and answer, the semantic commanding, or the content transformation on the one or more of the content chunks, the one or more respective textual summaries, or the combination thereof into an output; and causing the user interface of the client device to display the output.

5. The data processing system of claim 1, wherein the machine-readable storage medium further includes instructions configured to cause the processor alone or in combination with other processors to perform:

receiving a call requesting the generative language model to combine semantic trees of source contents;

constructing, via the prompt construction unit, a third prompt by appending the semantic trees of source contents to a third instruction string, the third instruction string including natural language instructions to the generative language model to determine one or more sets of common topic nodes and one or more sets of common leaf nodes in the semantic trees of the source contents, and to merge each set of a common topic node into one topic node and each set of a common leaf node into one leaf node to obtain a merged semantic tree of the source contents;

providing, via the prompt construction unit, as an input the third prompt to the generative language model and receiving as an output the merged semantic tree of the source contents from the generative language model; and storing the merged semantic tree in the database.

6. The data processing system of claim 1, wherein the machine-readable storage medium further includes instructions configured to cause the processor alone or in combination with other processors to perform:

receiving a call requesting the generative language model to retrieve content relevant to a query from the database;

constructing, via the prompt construction unit, a fourth prompt by appending the query to a fourth instruction string, the fourth instruction string including natural language instructions to the generative language model to determine a query embedding based on the query, to perform a similarity search between the query embedding and semantic embeddings of leaf nodes of semantic trees in the database, and to assemble content chunks of leaf nodes with semantic embeddings closest to the query embedding into a response to the query;

providing, via the prompt construction unit, as an input the fourth prompt to the generative language model and receiving as an output the response to the query from the generative language model;

providing the response to the client device; and causing a user interface of the client device to render the response.

7. The data processing system of claim 6, wherein the fourth instruction string further includes natural language instructions to the generative language model to consider at least one of semantic outlines or textual summaries of nodes of the semantic trees in the database to narrow down the semantic embeddings of leaf nodes of semantic trees.

8. The data processing system of claim 1, wherein the machine-readable storage medium further includes instructions configured to cause the processor alone or in combination with other processors to perform:

receiving a call requesting the generative language model to generate a target content of a second file type mapped to at least one portion of the source content of a first file type;

constructing, via the prompt construction unit, a fifth prompt by appending the first file type of the source content, the at least one portion of the source content, and the second file type of the target content to a fifth instruction string, the fifth instruction string including natural language instructions to the generative language model to segment at least a portion of a first semantic tree of the source content corresponding to the at least one portion of the source content into components of a second semantic tree of the target content based on different attributes of the first file type and the second file type, and to generate the target content in the second file type based on the components of the second semantic tree, the second semantic tree mapping to the at least a portion of the first semantic tree;

providing, via the prompt construction unit, as an input the fifth prompt to the generative language model and receiving as an output the mapping and the target content from the generative language model; and storing the mapping and the target content in the database.

9. The data processing system of claim 8, wherein the source content is a document file, and the target content is a presentation slide file.

10. The data processing system of claim 8, wherein the machine-readable storage medium further includes instructions configured to cause the processor alone or in combination with other processors to perform:

in response to one or more data updates to the source content, constructing, via the prompt construction unit, a sixth prompt by appending the one or more data updates, the source content, the first semantic tree, the mapping, and the target content to a sixth instruction string, the sixth instruction string including natural language instructions to the generative language model to map and update the one or more data updates to the source content into one or more nodes in the first semantic tree into an updated first semantic tree, and to map and update a part of the target content based on the mapping and the first semantic tree into updated target content;

providing, via the prompt construction unit, as an input the sixth prompt to the generative language model and receiving as an output the updated first semantic tree and the updated target content from the generative language model; and storing the updated first semantic tree and the update target content in the database.

11. The data processing system of claim 10, wherein the machine-readable storage medium further includes instructions configured to cause the processor alone or in combination with other processors to perform at least one of:

receiving the one or more data updates via a user interface of the client device, or comparing the source content and an updated source content to determine the one or more data updates to the source content.

12. The data processing system of claim 10, wherein the sixth instruction string includes natural language instructions to the generative language model to update the one or more nodes in the first semantic tree with one or more indices based on the one or more data updates to the source content, and wherein the one or more indices include add, update, and delete.

13. The data processing system of claim 10, wherein the machine-readable storage medium further includes instructions configured to cause the processor alone or in combination with other processors to perform operations of:

storing the first semantic tree of the source content and the mapping in the target content.

14. The data processing system of claim 1, wherein at least one non-leaf node of the semantic tree includes a list of suggested questions and corresponding answers, and wherein the second instruction string further includes natural language instructions to the generative language model to traverse in the semantic tree for textual summary generation, or to look up in the semantic tree for question and answer, semantic commanding, or content transformation.

15. A method comprising:

receiving, by a processor, a call requesting a generative language model to generate a semantic tree for a source content;

constructing, via a prompt construction unit, a first prompt by appending the source content to a first instruction string, the first instruction string including natural language instructions to the generative language model to analyze a semantic structure of the source content and to generate a semantic outline and content chunks of the source content, the semantic outline including one or more topics each connected with one or more of the content chunks, to compute one textual summary respectively for each topic node in the semantic tree corresponding to one of the topics, to apply indices to reference a position of each topic node in the semantic tree, and to apply indices to reference a position of each leaf node of the semantic tree corresponding to one of the content chunks;

providing, via the prompt construction unit, as an input the first prompt to the generative language model and receiving as an output the semantic tree of the source content from the generative language model;

storing the semantic tree in a database;

receiving a call requesting the generative language model to generate a new semantic tree for the source content upon meeting one or more criteria, wherein the one or more criteria include a threshold number of updates made to the source content;

constructing, via the prompt construction unit, a second prompt by appending the semantic tree, the source content and the updates to a second instruction string, the second instruction string including natural language instructions to the generative language model to:

generate a new semantic outline by adding a new topic or editing an existing topic into an updated topic in the semantic outline for each of the updates when the new topic or the updated topic is not a duplicate of an existing topic in the semantic outline, compute a textual summary for a topic node corresponding to the new topic or the updated topic, add an index to reference a position of the topic node corresponding to the new topic or the updated topic in the semantic tree, and add an index to reference a position of each leaf node corresponding to a content chunk associated with the new topic or the updated topic in the semantic tree;

providing, via the prompt construction unit, as an input the second prompt to the generative language model and receiving as an output from the generative language model the new semantic tree including the new topic or the updated topic, as well as the indices, the respective textual summaries, and the content chunks associated with the new topic or the updated topic; and storing the new semantic tree in the database, wherein the processor is embedded in a server or a client device connecting to the server via a network.

16. The method of claim 15, further comprising:

receiving a call requesting the generative language model to generate a target content of a second file type mapped to at least one portion of the source content of a first file type;

constructing, via the prompt construction unit, a fifth prompt by appending the first file type of the source content, the at least one portion of the source content, and the second file type of the target content to a fifth instruction string, the fifth instruction string including natural language instructions to the generative language model to segment at least a portion of a first semantic tree of the source content corresponding to the at least one portion of the source content into components of a second semantic tree of the target content based on different attributes of the first file type and the second file type, and to generate the target content in the second file type based on the components of the second semantic tree, the second semantic tree mapping to the at least a portion of the first semantic tree;

providing, via the prompt construction unit, as an input the fifth prompt to the generative language model and receiving as an output the mapping and the target content from the generative language model; and storing the mapping and the target content in the database.

17. The method of claim 16, further comprising:

in response to one or more data updates to the source content, constructing, via the prompt construction unit, a sixth prompt by appending the one or more data updates, the source content, the first semantic tree, the mapping, and the target content to a sixth instruction string, the sixth instruction string including natural language instructions to the generative language model to map and update the one or more data updates to the source content into one or more nodes in the first semantic tree into an updated first semantic tree, and to map and update a part of the target content based on the mapping and the first semantic tree into updated target content;

providing, via the prompt construction unit, as an input the sixth prompt to the generative language model and receiving as an output the updated first semantic tree and the updated target content from the generative language model; and storing the updated first semantic tree and the update target content in the database.

18. A non-transitory computer readable medium on which are stored instructions that, when executed, cause a programmable device to perform functions of:

receiving a call requesting a generative language model to generate a semantic tree for a source content;

constructing, via a prompt construction unit, a first prompt by appending the source content to a first instruction string, the first instruction string including natural language instructions to the generative language model to analyze a semantic structure of the source content and to generate a semantic outline and content chunks of the source content, the semantic outline including one or more topics each connected with one or more of the content chunks, to compute one textual summary respectively for each topic node in the semantic tree corresponding to one of the topics, to apply indices to reference a position of each topic node in the semantic tree, and to apply indices to reference a position of each leaf node of the semantic tree corresponding to one of the content chunks;

providing, via the prompt construction unit, as an input the first prompt to the generative language model and receiving as an output the semantic tree of the source content from the generative language model;

storing the semantic tree in a database;

receiving a call requesting the generative language model to generate a new semantic tree for the source content upon meeting one or more criteria, wherein the one or more criteria include a threshold number of updates made to the source content;

constructing, via the prompt construction unit, a second prompt by appending the semantic tree, the source content and the updates to a second instruction string, the second instruction string including natural language instructions to the generative language model to:

generate a new semantic outline by adding a new topic or editing an existing topic into an updated topic in the semantic outline for each of the updates when the new topic or the updated topic is not a duplicate of an existing topic in the semantic outline, compute a textual summary for a topic node corresponding to the new topic or the updated topic, add an index to reference a position of the topic node corresponding to the new topic or the updated topic in the semantic tree, and add an index to reference a position of each leaf node corresponding to a content chunk associated with the new topic or the updated topic in the semantic tree;

providing, via the prompt construction unit, as an input the second prompt to the generative language model and receiving as an output from the generative language model the new semantic tree including the new topic or the updated topic, as well as the indices, the respective textual summaries, and the content chunks associated with the new topic or the updated topic; and storing the new semantic tree in the database, wherein the programmable device is embedded in a server or a client device connecting to the server via a network.

19. The non-transitory computer readable medium of claim 18, wherein the instructions when executed, further cause the programmable device to perform functions of:

receiving a call requesting the generative language model to generate a target content of a second file type mapped to at least one portion of the source content of a first file type;

constructing, via the prompt construction unit, a fifth prompt by appending the first file type of the source content, the at least one portion of the source content, and the second file type of the target content to a fifth instruction string, the fifth instruction string including natural language instructions to the generative language model to segment at least a portion of a first semantic tree of the source content corresponding to the at least one portion of the source content into components of a second semantic tree of the target content based on different attributes of the first file type and the second file type, and to generate the target content in the second file type based on the components of the second semantic tree, the second semantic tree mapping to the at least a portion of the first semantic tree;

providing, via the prompt construction unit, as an input the fifth prompt to the generative language model and receiving as an output the mapping and the target content from the generative language model; and storing the mapping and the target content in the database.

20. The non-transitory computer readable medium of claim 19, wherein the instructions when executed, further cause the programmable device to perform functions of:

in response to one or more data updates to the source content, constructing, via the prompt construction unit, a sixth prompt by appending the one or more data updates, the source content, the first semantic tree, the mapping, and the target content to a sixth instruction string, the sixth instruction string including natural language instructions to the generative language model to map and update the one or more data updates to the source content into one or more nodes in the first semantic tree into an updated first semantic tree, and to map and update a part of the target content based on the mapping and the first semantic tree into updated target content;

providing, via the prompt construction unit, as an input the sixth prompt to the generative language model and receiving as an output the updated first semantic tree and the updated target content from the generative language model; and storing the updated first semantic tree and the update target content in the database.

* * * * *